US006449661B1

(12) United States Patent
Fujishima

(10) Patent No.: US 6,449,661 B1
(45) Date of Patent: Sep. 10, 2002

(54) APPARATUS FOR PROCESSING HYPER MEDIA DATA FORMED OF EVENTS AND SCRIPT

(75) Inventor: Takuya Fujishima, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 08/907,162

(22) Filed: Aug. 6, 1997

(30) Foreign Application Priority Data

Aug. 9, 1996 (JP) .......................................... 8-226145
Aug. 9, 1996 (JP) .......................................... 8-226146
Aug. 9, 1996 (JP) .......................................... 8-226147
Aug. 9, 1996 (JP) .......................................... 8-226148

(51) Int. Cl.[7] .......................................... G06F 13/14
(52) U.S. Cl. .......................... 710/5; 713/2; 713/100; 345/302
(58) Field of Search .......................... 710/1, 5; 713/1, 713/2, 100; 345/302

(56) References Cited

U.S. PATENT DOCUMENTS 4,497,023 A * 1/1985 Moorer ....................... 712/205
4,903,019 A * 2/1990 Ito .............................. 341/61
5,138,925 A * 8/1992 Koguchi et al. .............. 84/609
5,155,286 A * 10/1992 Saito et al. ................... 84/611
5,202,977 A * 4/1993 Pasetes, Jr. et al. ......... 395/500
5,286,908 A * 2/1994 Jungleib ...................... 81/603
5,532,425 A 7/1996 Nahata et al.
5,564,044 A * 10/1996 Pratt .......................... 709/106
5,621,877 A * 4/1997 Neumann et al. ........... 395/326
5,640,590 A * 6/1997 Luther ........................ 395/806
5,781,687 A * 7/1998 Parks .......................... 386/52
5,793,839 A * 8/1998 Farris et al. .................. 379/34
5,845,090 A * 12/1998 Collins, III et al. ........ 709/221
5,930,749 A * 7/1999 Maes ......................... 704/228
5,937,161 A * 8/1999 Mulligan et al. ...... 340/825.44
5,945,619 A * 8/1999 Tamura ....................... 84/604
5,982,980 A * 11/1999 Tada .......................... 386/96

OTHER PUBLICATIONS

Notator LOGIC Macintosh Version 1.6 Aug. 1993 Midia Corporation.
Cakewalk Professional, Nov. 5, 1990, Chapter 14 pp. 187–205.

* cited by examiner

*Primary Examiner*—Jeffrey Gaffin
*Assistant Examiner*—Abdelmoniem Elamin
(74) *Attorney, Agent, or Firm*—Rossi & Associates

(57) ABSTRACT

A data processing apparatus has an input that provides a sequence composed of events and a script. The events are data determining time-sequential occurrence of multimedia matter, while the script is a program modifying the time-sequential occurrence of multimedia matter. The data processing apparatus operates when reference is made to the provided sequence for executing the script to rewrite the events, and provides the sequence containing the rewritten events in response to the reference for a modifying the time-sequential occurrence of the multimedia matter.

17 Claims, 28 Drawing Sheets

| time | event | label |
|---|---|---|
| | Event A1 | melody tenuto first |
| | Event C1 | chord |
| | Event D1 | chord bass |
| | Event B1 | chord top |
| | Event A2 | melody tenuto |
| | Event C2 | chord |
| | Event D2 | chord bass |
| | Event B2 | chord top |

FIG.22 (a)
| CURVE A | |
|---|---|
| time | value |
| 10 | 40 |
| 70 | 80 |
| 110 | 20 |
| 140 | 60 |
| 140 | 120 |
| 190 | 140 |
| 240 | 40 |
FIG.22 (b)
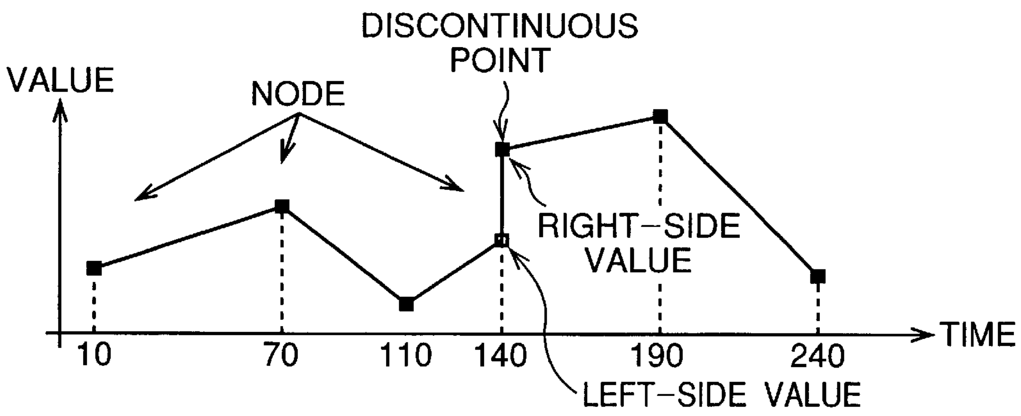
FIG.22 (c)
| CURVE B | |
|---|---|
| time | value |
| 60 | 60 |
| 110 | 80 |
| 130 | 60 |
| 170 | 60 |
| 190 | 100 |
| 190 | 140 |
| 220 | 140 |
| 260 | 100 |
FIG.22 (d)
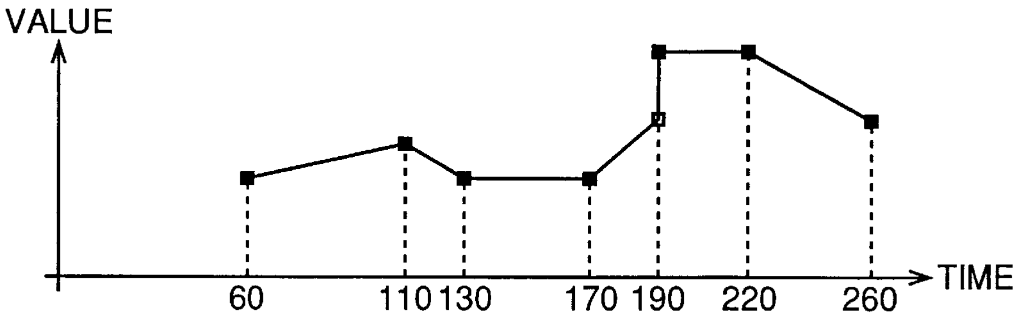

FIG.24 (a)
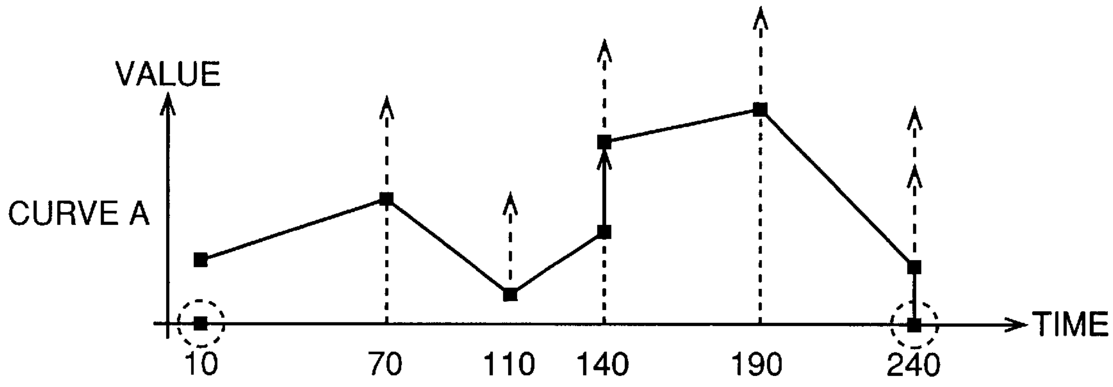
FIG.24 (b)
| time | value |
|---|---|
| 10 | 0+0 |
| 10 | 40+0 |
| 70 | 80+64 |
| 110 | 20+80 |
| 140 | 60+60 |
| 140 | 120+60 |
| 190 | 140+100 |
| 240 | 40+120 |
| 240 | 0+120 |
FIG.24 (c)
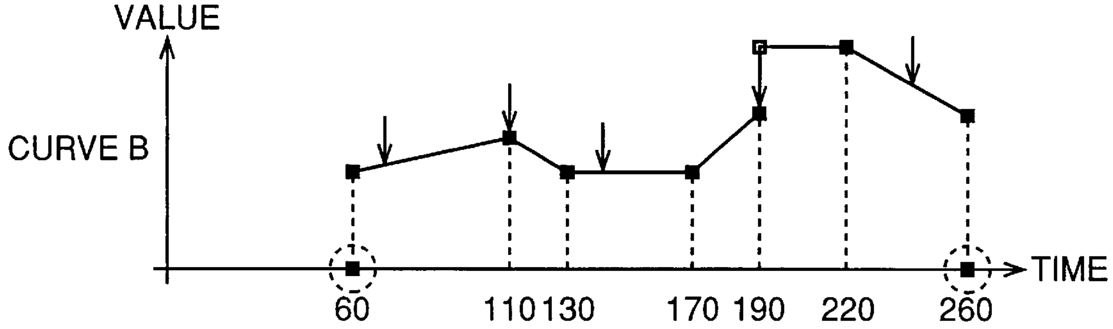
FIG.24 (d)
| time | value |
|---|---|
| 60 | 0 |
| 60 | 60 |
| 110 | 80 |
| 130 | 60 |
| 170 | 60 |
| 190 | 100 |
| 190 | 140 |
| 220 | 140 |
| 260 | 100 |
| 260 | 0 |

FIG.25 (a)
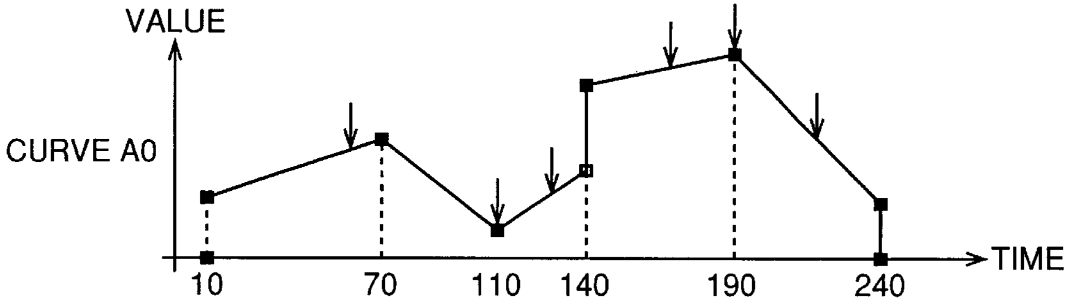
FIG.25 (b)
| time | value |
|---|---|
| 10 | 0 |
| 10 | 40 |
| 70 | 80 |
| 110 | 20 |
| 140 | 60 |
| 140 | 120 |
| 190 | 140 |
| 240 | 40 |
| 240 | 0 |
FIG.25 (c)
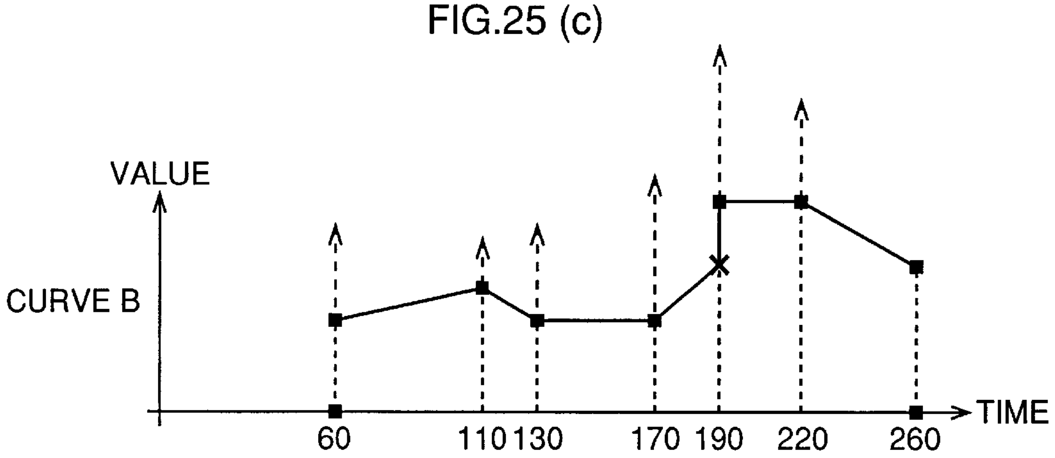
FIG.25 (d)
| time | value |
|---|---|
| 60 | 0+73 |
| 60 | 60+73 |
| 110 | 80+20 |
| 130 | 60+47 |
| 170 | 60+108 |
| ~~190~~ | ~~100~~ |
| (190 | 140+140 |
| 220 | 140+80 |
| 260 | 100+0 |
| 260 | 0+0 |

| time | value |
|---|---|
| 10 | 0+0 |
| 10 | 40+0 |
| 60 | 0+73 |
| 60 | 60+73 |
| 70 | 80+64 |
| 110 | 20+80 |
| 130 | 60+47 |
| 140 | 60+60 |
| 140 | 120+60 |
| 170 | 60+108 |
| 190 | 140+100 |
| 190 | 140+140 |
| 220 | 140+80 |
| 240 | 40+120 |
| 240 | 0+120 |
| 260 | 100+0 |
| 260 | 0+0 |

APPARATUS FOR PROCESSING HYPER MEDIA DATA FORMED OF EVENTS AND SCRIPT

BACKGROUND OF THE INVENTION

The present invention relates to a processing apparatus for processing data including a sequence constituted by time-sequential event data and a script indicating a rewriting procedure for rewriting the time-sequential event data.

For a format of time-sequential event data, AIFF is known. For example, in the field of music, this AIFF is applied to a standard MIDI file (hereafter referred to as an SMF). MIDI stands for Musical Instrument Digital Interface. MIDI isa standard established for interconnecting different musical instruments or a sequencer, a computer, a lighting control, a mixer, and so on for music information exchange. SMF is a file format designed for recording and storing event information to be exchanged real-time by MIDI with a time stamp attached.

With SMF, which is currently in wide use, only a primitive MIDI event sequence can be stored and transferred. It is hence difficult for SMF to transfer complex information such as a musical structure and a quantitative parameter varying with time during music performance. Such information can only be stored in a format unique to sequencer software.

Consequently, it has been impossible to transfer sophisticated information such as a temporal position of event data and time-variable data. To solve this problem, introduction of a new format may be desired. This, however, gives rise to a new problem of incompatibility with the conventional formats.

Application of delicate music expression to performance data is generally practiced. To do this by means of SMF, it is required to manually apply expression to each note event, making the work complicated and hence taking a lot of time. Moreover, the application of the music expression is often repetition of typical procedures. Nevertheless, the prior art requires to apply expression one by one even for these typical procedures.

In creating MIDI performance data, a user sets a variety of parameters such that optimum sound can be obtained from a sound source being used. If the performance data thus created is supplied to another sound source of a different type, it is likely that the performance data is reproduced from another sound source as unnatural sounds. Further, a template that provides a typical performance pattern is routinely utilized. However, SMF cannot modify the contents of the template, thereby causing a problem in flexibility. Further, SMF cannot group a plurality of music sequences, making it inconvenient to hold templates. Therefore, there is no means but to place the templates in an additional track that cannot be used for regular sounding.

SMF data can be recorded on a plurality of tracks. However, since these tracks are fixed to start at the same point of time, the degree of freedom of editing is limited. This problem becomes especially conspicuous when a plurality of music pieces are edited altogether.

SUMMARY OF THE INVENTION

It is therefore an object of the present invention to provide a data processing apparatus for defining a data structure constituted by time-sequential event data and a script for indicating a rewriting procedure for rewriting this time-sequential event data to transfer sophisticated information such as a complex data structure and a time-variable profile curve, and to provide a recording medium on which the defined data structure is recorded.

It is another object of the present invention to provide a data processing apparatus for processing hyper data composed of a script for repeating a typical procedure and time-sequential events, and to provide a recording medium on which the data composed of the script and the time-sequential events is recorded.

It is still another object of the present invention to provide a data processing apparatus for processing data composed of a script for rewriting time-sequential event data suitably for sound sources of different types, and to provide a recording medium on which the data composed of the script and the time-sequential events is recorded.

It is yet another object of the present invention to provide a data processing apparatus for selectively processing time-sequential event data by execution of a script.

It is a further object of the present invention to provide a data processing apparatus for processing a package capable of grouping a plurality of sequences each composed of a script and events.

It is a still further object of the present invention to provide a data processing apparatus for processing time-sequential data capable of representing time-variable continuous data in terms of discrete data, and to provide a recording medium on which the time-sequential data is recorded.

It is a yet further object of the present invention to provide a data processing apparatus for representing time-variable continuous data by using discrete data for facilitating the processing of the time-variable continuous data.

It is an additional object of the present invention to provide a data processing apparatus for enhancing degree of freedom of editing by placing a script in a package capable of storing a plurality of event data sequences, thereby providing a plug-in module capability.

It is a still additional object of the present invention to provide a data processing apparatus for sharing event data and scripts between a plurality of packages by arranging these packages in order.

It is a yet additional object of the present invention to provide a data processing apparatus for providing flexible usage of scripts among packages.

It is a separate object of the present invention to provide a data processing apparatus for realizing compatibility between data in a conventional format and data in a new format capable of transferring sophisticated information, and to provide a recording medium on which data is recorded in the new format.

In a first aspect of the invention, a data processing apparatus comprises an input that provides a sequence composed of events and a script, the events being data determining time-sequential occurrence of multimedia matter, while the script being a program modifying the time-sequential occurrence of multimedia matter, a processor operative when reference is made to the provided sequence for executing the script to rewrite the events, and an output that provides the sequence containing the rewritten events in response to the reference for modifying the time-sequential occurrence of the multimedia matter.

Preferably, the input affixes an identification code to an event for discriminating from each other, and the processor discriminatively processes the events according to the identification code during the course of execution of the script.

Preferably, the input provides a curve sequence containing a discrete series of events each being data determining a pair of a time and a value such that the curve sequence represents a time-variation of the multimedia matter, and the processor rewrites the value of each event so as to modify the time-variation of the multimedia matter. In such case, the processor interpolates the value between successive events during execution of the script so as to convert the discrete series of the events into a continuous series of the events.

Preferably, the input provides a music sequence composed of music events determining time-sequential occurrence of music notes as one form of the multimedia matter.

Preferably, the processor comprises a separator for separating the events and the script from each other which are initially bound to each other to compose the sequence, an interpreter for interpreting the separated script to produce an executable program, and a rewriter for executing the program to rewrite the separated events.

In a second aspect of the invention, a data processing apparatus comprises an input that provides a plurality of sequences each being composed of events which are data determining time-sequential occurrence of multimedia matter, one of the sequences containing a link event which is a secondary reference to another sequence, a processor operative when a primary reference is made to said one of the sequences for extracting therefrom the link event, and for incorporating said another sequence referred to by the link event into said one sequence in place of the link event so as to form a composite sequence, and an output that provides the composite sequence in response to the primary reference for presenting the time-sequential occurrence of the multimedia matter.

Preferably, the input provides said another sequence in the form of a curve sequence containing a series of events each being data determining a pair of a time and a value such that the curve sequence represents time-variation of the multimedia matter, and the processor incorporates the curve sequence into said one sequence so as to apply the time-variation to the time-sequential occurrence of the multimedia matter.

Preferably, the input provides said one sequence containing a first link event and a second link event, and provides a first curve sequence corresponding to the first link event and a second curve sequence corresponding to the second link event, and the processor comprises a mixer operative when first time-variation represented by the first curve sequence and second time-variation represented by the second curve sequence overlap with each other for consolidating the first curve sequence and the second curve sequence into a composite curve sequence, and for concurrently consolidating the first link event and the second link event into a single link event to conform with the composite curve sequence.

Preferably, the input provides said one sequence in the form of a music sequence composed of music events determining time-sequential occurrence of music notes as one form of the multimedia matter, and provides the curve sequence representing time-variation of the music notes.

Preferably, the input provides said one sequence in the form of one music sequence composed of music events determining time-sequential occurrence of music notes as one part of the multimedia matter, and provides said another sequence in the form of another music sequence composed of music events determining time-sequential occurrence of music notes as another part of the multimedia matter, and the processor incorporates said another music sequence into said one music sequence by means of the link event so as to present a whole of the multimedia matter.

In a third aspect of the invention, a data processing apparatus comprises an input that loads a package which is a file containing at least one sequence and a plurality of scripts, the scripts including a package-script bound to the package and a sequence-script bound to the sequence, the sequence being composed of events which are data determining time-sequential occurrence of multimedia matter while the sequence-script is a program modifying the time-sequential occurrence of the multimedia matter, a processor operative when the package is loaded for executing the package-script to initialize the file, and being operative when reference is made to the sequence for executing the sequence-script to rewrite the events, and an output that provides the sequence containing the rewritten events in response to the reference for modifying the time-sequential occurrence of the multimedia matter.

Preferably, the input loads a plurality of the packages each of which contains the package-script having definition of a subroutine while one of the scripts belonging to the packages has a call command for a subroutine, and the processor comprises a sorter that sorts the provided packages to define a search order, an initializer that executes each package-script to prepare a dictionary of a subroutine according to the definition thereof, and a searcher operative when said one script is executed for searching the dictionaries of the respective packages according to the defined search order to call the subroutine specified by the call command. Preferably, the sorter can exchange, add and delete the packages to arrange the search order.

Further, the inventive data processing apparatus comprises an input that provides a plurality of packages each of which can accommodate therein at least one sequence, the sequence being composed of events which are data determining time-sequential occurrence of multimedia matter, one sequence belonging to one package containing a link event which is a secondary reference to another sequence belonging to another package, a sorter that sorts the provided packages to define a search order, a processor operative when a primary reference is made to said one sequence for extracting therefrom the link event, then searching the packages according to the defined search order to find said another sequence referred to by the link event, and incorporating said another sequence into said one sequence in place of the link event so as to form a composite sequence, and an output that provides the composite sequence in response to the primary reference for presenting the time-sequential occurrence of the multimedia matter. Preferably, the sorter can exchange, add and delete the packages to arrange the search order.

In a fourth aspect of the invention, a data processing apparatus comprises an input that provides mixture of a first sequence having a simple format and a second sequence having a complex format, the first sequence being composed of events alone, the second sequence being composed of events and a script, the events being data determining time-sequential occurrence of multimedia matter while the script being a program modifying the time-sequential occurrence of the multimedia matter, a processor operative when reference is made to the first sequence for simply processing the same and being operative when alternative reference is made to the second sequence for executing the script to rewrite the events, and an output that provides the second sequence containing the rewritten events in response to the alternative reference for modifying the time-sequential occurrence of the multimedia matter.

Preferably, the input provides the mixture of the first sequence and the second sequence in a serial track such that the first sequence and the second sequence are interleaved with one another.

Preferably, the input provides the mixture of the first sequence and the second sequence in parallel tracks such that the first sequence is allotted to one of the parallel tracks while the second sequence is allotted to another of the parallel tracks.

Preferably, the input provides the first sequence and the second sequence, each being composed of music events determining time-sequential occurrence of music notes as a specific form of the multimedia matter.

In carrying out the invention and according the first aspect thereof, a time-sequential event can be rewritten by executing a script to generate modified time-sequential event data with active features and wide varieties. A template of the time-sequential events can be rewritten by executing the script, hence the template can be provided with active features and wide varieties. Further, since each time-sequential event data can be identified at the script execution, each of the time-sequential event data can be manipulated selectively and individually, thereby enhancing ease of operation. Still further, while time-variable data is conventionally represented in a discrete MIDI event series, the present invention represents the time-variable data in the form of a line curve data, thereby enabling to abstract all kinds of time-variable parameters such as volume and tempo of music composition. Yet further, this curve data can be transferred without need of format change. In addition, the present invention can prepare a script for indicating a procedure for optimizing data for different models of sound source , thereby generating an optimum tone with any sound source model. Moreover, sequences composed of events and a script can be grouped into a package, such that typical templates can be held in a package, thereby facilitating data generation.

In carrying out the invention and according to the second aspect thereof, when a time-sequential event is rewritten by executing a script, a link event placed in a time-sequential event data series is settled. Hence, if a typical representation pattern is used repeatedly, only one typical representation pattern is provided and reference thereto by a link event is used, thereby capturing the provided representation pattern every time the same is required. Further, while time-variable continuous data is conventionally represented as a discrete MIDI event series, the present invention represents the time-variable data in the form of folded line curve data described by a list of a series of time-sequential events each denoted by a pair of an occurrence time and a corresponding value. The line curve data is referenced by a link event, thereby facilitating consolidation with other time-variable continuous data. This novel setup allows time-variable continuous data indicating an attenuation profile to be commonly applied to both of volume and tempo, for example. At the same time, this novel setup allows generation of time-variable continuous data of a modified profile. Still further, the novel setup makes the stored curve data independent and available only by linking the curve data, thereby facilitating reuse and sharing of the curve data.

In carrying out the invention and according to the third aspect thereof, a package-script can be placed in a package in which sequences are stored, thereby providing a plug-in module capability. This results in an extended capability of enhancing the degree of freedom of editing, for example. Further, a data model is defined such that packages in which sequences are stored are held in an desired order by which the packages are searched at link event settlement, thereby allowing changing of the package line-up order and link destinations by package deletion or insertion. This results in flexible sharing of data.

In carrying out the invention and according to the fourth aspect thereof, data of a second format is embedded in data of a first format. In a reproducing, machine in which only the data of the first or old format can be reproduced the data of the second or new format is ignored. In another reproducing machine in which the data of the second format can be reproduced, only the data of the second format is extracted for reproduction. Consequently, the novel second format capable of exchanging sophisticated information realizes compatibility with the conventional first format.

The above and other objects, features and advantages of the present invention will become more apparent from the accompanying drawings, in which like reference numerals are used to identify the same or similar parts in several views.

BRIEF DESCRIPTION OF THE DRAWINGS

FIGS. 22(*a*) through 22(*d*) are a diagram for explaining consolidation of curve data in the data processing apparatus associated with the present invention;

FIGS. 24(*a*) through 24(*d*) are still another diagram for explaining consolidation of curve data in the data processing apparatus associated with the present invention;

FIGS. 25(*a*) through 25(*d*) are yet another diagram for explaining consolidation of curve data in the data processing apparatus associated with the present invention;

DETAILED DESCRIPTION OF PREFERRED EMBODIMENTS

This invention will be described in further detail by way of example with reference to the accompanying drawings.

Figure 1:
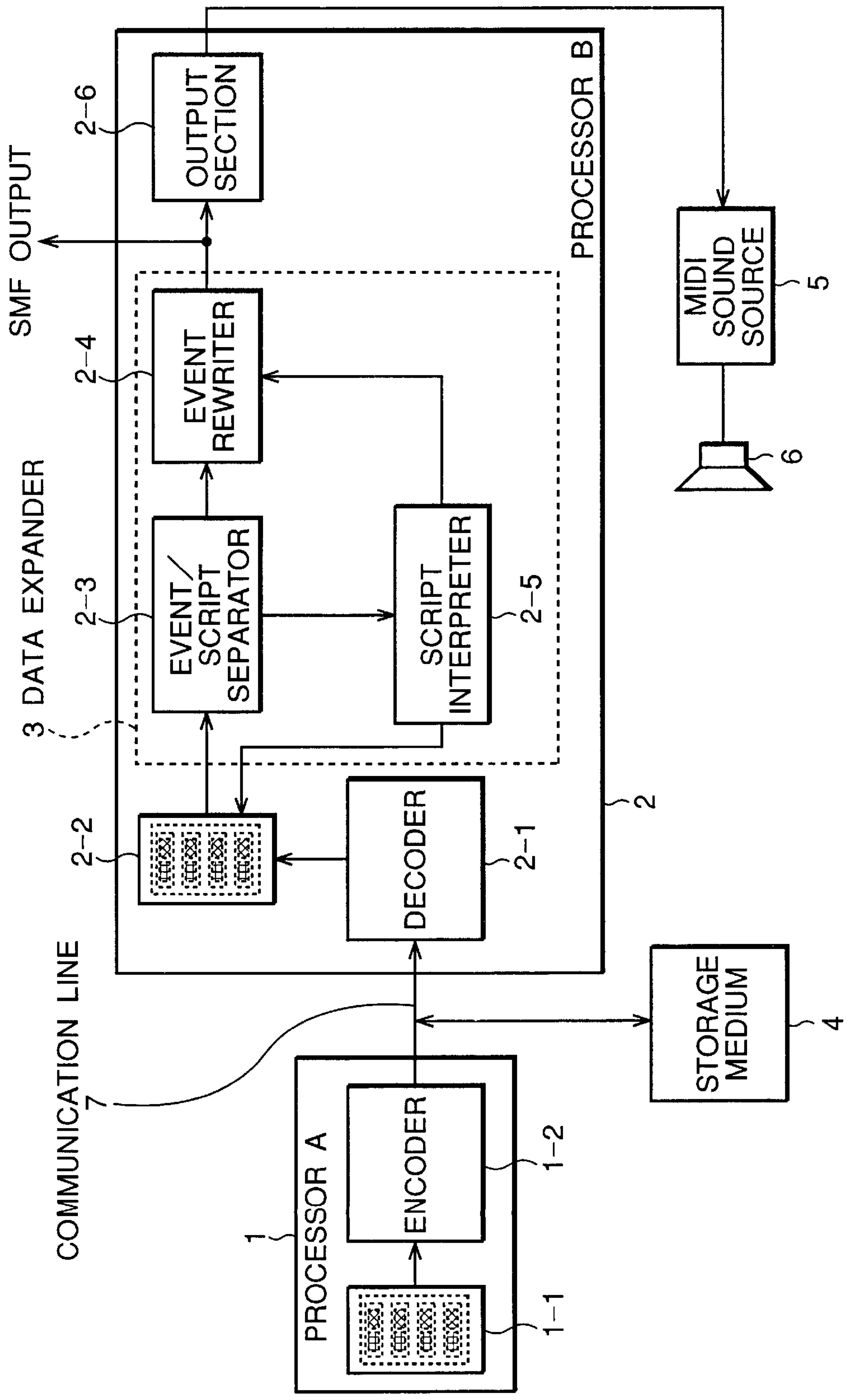
FIG. 1 is a functional block diagram illustrating a data processing apparatus associated with the present invention.

Now, referring to FIG. 1, there is shown a functional block diagram illustrating a data processing apparatus practiced as one preferred embodiment of the present invention. This data processing apparatus is a MIDI sequencer that processes music data including time-sequential data. A format of the data handled in this data processing apparatus is newly defined by the present invention.

The novel data format is herein referred to as a Hyper Media File (hereafter referred to as HMF). The HMF provides a generalized data model capable of describing sophisticated information. This data model is defined from two aspects; a static structure of data and a dynamic mechanism. The model defined this way is referred to as a Hyper Media Data Model (hereafter referred to as HMDM). Installation of transform between an internal unique data structure and the HMDM onto the software of the sequencer realizes free exchange of sophisticated information. To be more specific, the HMF is defined as a format that stores the HMDM in a file form. For example, the HMF can be built based on a standard MIDI file (SMF) for the music description by a MIDI event. Generally, the HMF is not limited to MIDI event data; it is also applicable to time-sequential event data including audio data and video data.

Figure 3:
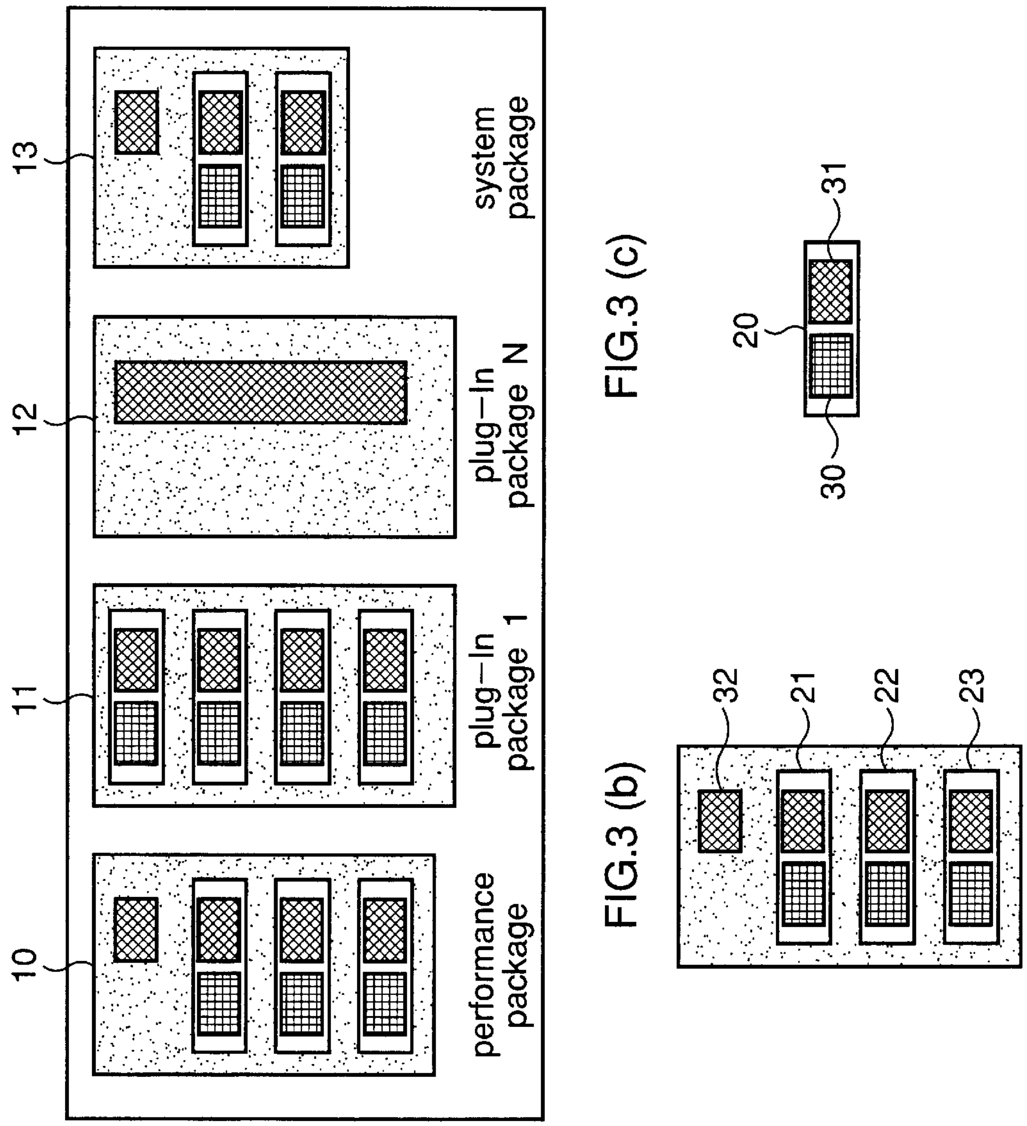
FIGS. 3(*a*), 3(*b*) and 3(*c*), are a diagram illustrating a data structure of HMDM, a package, and a sequence defined by the present invention.

The following describes the data processing apparatus practiced as one preferred embodiment of the present invention with the HMF applied to music performance with reference to FIG. 1. In FIG. 1, a processor A denoted by reference numeral 1 generates music performance data. The generated performance data is stored in a buffer memory 1-1. The structure of the performance data stored in the buffer memory 1-1 is the HMDM. The HMDM stores a plurality of packages 10 through 13 as shown in FIG. 3(*a*). An HMF encoder 1-2 encodes the music performance data having the HMDM data structure to the HMF format on a package basis, and outputs the encoded format. The packages to be encoded to the HMF format are illustrated by dashed lines in the buffer memory 1-1. Each package holds a plurality of sequences as shown in FIG. 3(*b*).

The music performance data of the HMF format on the package basis outputted from the processor A is sent to a processor B or a storage medium 4 via a transmission path 7. The storage medium 4 stores the music performance data on package basis in the HMF format. Encoding one package and storing the encoded package in a file is referred to as "saving of the music performance data."

When the processor B indicated by reference numeral 2 receives data in the HMF format read from the storage medium 4 or transmitted from the processor A via a communication line 7, the processor B receives the data in the HMF format on the package basis. Each received package is decoded to a package having the data structure of HMDM, and the decoded package is held in a buffer memory 2-2. The procedure of reading a file, decoding the read file, restoring the decoded file to the HMDM as one package, and storing the restored package are referred to as "loading the file."

As shown in FIG. 3(*b*), one package 20 stores a plurality of sequences. As shown in FIG. 3(*c*), each of these sequences is composed of a pair of events 30 and a script 31. The script characterizes the HMF and is a program for indicating a procedure of data modification. The event data is converted into a final MIDI event series when the script is executed. That is, when playing back the music performance data received by the processor B, the HMDM stored in the buffer memory 2-2 is expanded by a data expander 3.

To the data expander 3, necessary sequences are sent successively. First, in an event/script separator 2-3, each sequence is separated into event data and a script. The separated script is interpreted by a script interpreter 21 5. Based on the interpretation, an event data rewriter 2-4 performs processing for rewriting the event data. This provides final time-sequential event data. This time-sequential event data is sent to a MIDI tone generator 5 as a MIDI signal via an output section 2-6, and is sounded from a sound system 6. Alternatively, the time-sequential event data can be outputted as a file in the SMF format as it is.

In the conventional SMF, performance data exchangeable between the processor A and the processor B is simple collection of raw MIDI data, hence only primitive data can be exchanged.

In the present invention, the newly defined HMF can be used to exchange performance data between the processor A and the processor B. In age this case, from time-sequential performance data with expression attached such that the expression is optimized for a sound source used in the processor A, an HMDM model including the information about that expression can be generated, and can be sent to the processor B in HMF format. Receiving the data of HMF format, the processor B restores the HMDM. Further, the processor B expands the HMDM such that the same becomes the performance data optimized for a sound source used by the processor B, providing the performance data in the form of a time-sequential event data series. This expansion is performed by executing a script prepared for revising and stored in the processor B beforehand. Thus, the HMF can distribute sequences including sophisticated information such as expression.

It should be noted that the processor A and the processor B are substantially the same in constitution. In the above description, the data is sent from the processor A to the processor B. It will be apparent that the data can also be send from the processor B to the processor A.

Figure 2:
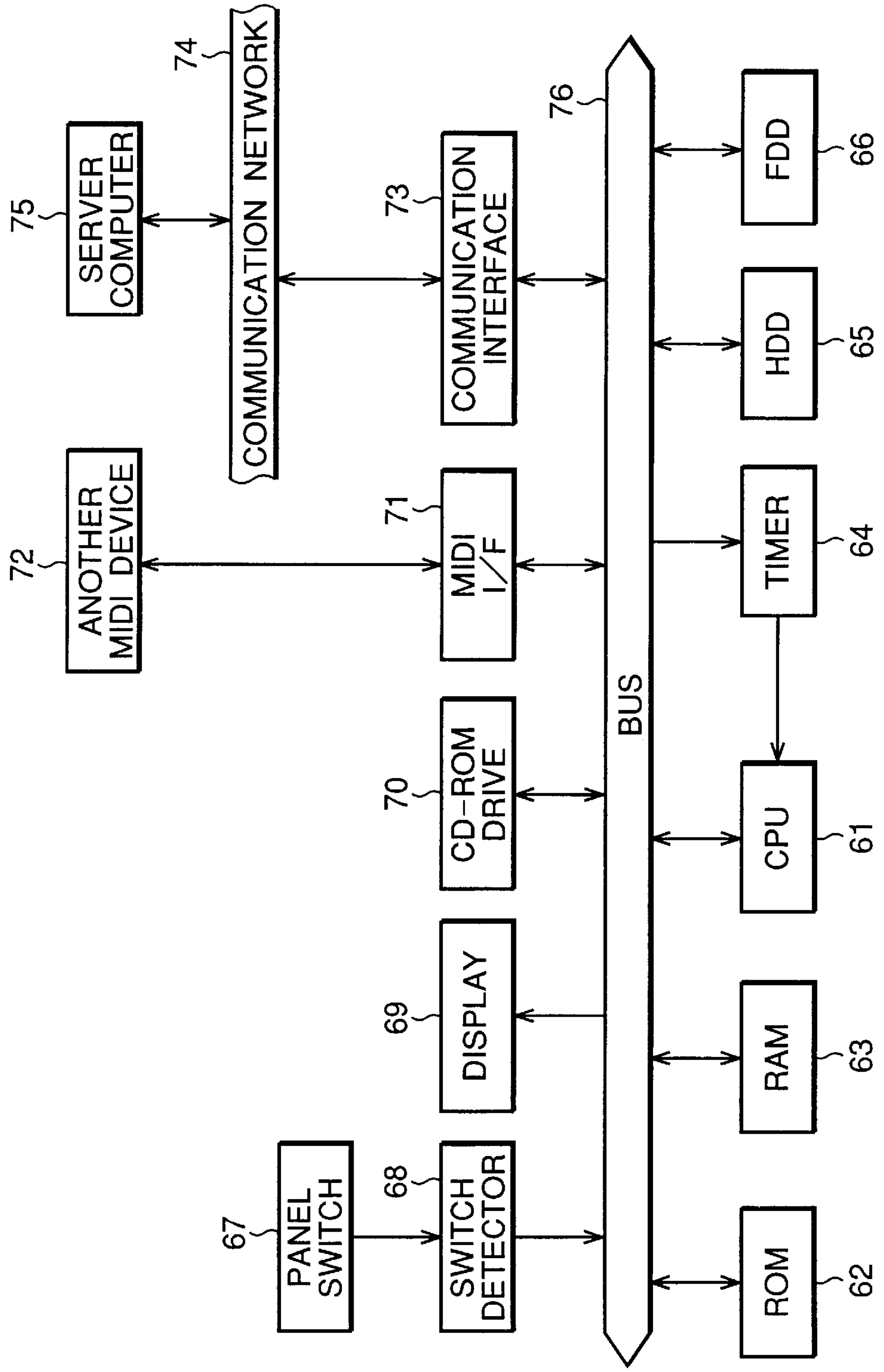
FIG. 2 is a block diagram illustrating a hardware constitution of the data processing apparatus associated with the present invention.

In FIG. 1, the processor A and the processor B are illustrated in functional blocks. FIG. 2 shows the hardware construction of the processor A and the processor B. In FIG. 2, a CPU 61 is a central processing unit for executing an operating program to perform various processing operations. A ROM 62 is a read-only memory in which the operating program and so on to be executed by the CPU 61 are stored. A RAM 63 is a random access memory to be used as a work memory by the CPU 61 when the same executes programs.

A HDD (Hard Disk Drive) 65 and a FDD (Floppy Disk Drive) 66 are storage devices in which the operating programs and various pieces of data are stored. If the operating program is not stored in the ROM 62, it is stored in a hard disk or a floppy disk of the FDD 65. The operating programs stored in the HDD 65 or the FDD 66 are read into the RAM 63. The CPU 61 reads the necessary operating programs from the RAM 63 and executes them, realizing substantially the same operation as that realized when the operating programs are stored in the ROM 62. It should be noted that the HDD 65 is freely readable and writable, so that addition or upgrading of the operating programs can be made with ease.

A panel switch 67 is a command input switch arranged on an operator panel. When the panel switch is operated, it is detected by a switch detector 68, a detection signal being sent to the CPU 61. A display 69 presents menus and operator information. Looking at the display, the user operates the panel switch 67.

A CD-ROM drive 70 is a device for reading the operating programs and various pieces of data from a CD-ROM. The operating programs and data read from the CD-ROM are written to a hard disk in the HDD 65. Therefore, an operating program can be newly installed or upgraded by the CD-ROM drive 70 with ease.

A MIDI interface (MIDI I/F) 71 transmits or receives MIDI data, to which another MIDI device 72 is connected. A communication interface 73 is connected to a communication network 74 such as a LAN (Local Area Network) or a telephone line. The data processing apparatus according to the present invention is connected to a server computer 75 via this communication network 74. If the operating programs and data are not stored in the HDD 65, they are downloaded from the server computer 75 into the HDD 65 through the communication interface 73.

To be more specific, the data processing apparatus according to the invention, which serves as a client computer, sends a request command to the server computer 75 via the communication interface 73 and the communication network 74, requesting for downloading of the necessary operating programs and data. Receiving this request command, the server computer 75 distributes the requested operating programs and data to the data processing apparatus via the communication network 74. The data processing apparatus receives these operating programs and data via the communication interface 73, and stores them in the HDD 65, upon which downloading is completed.

The present invention is associated with the data processing apparatus for processing the above-mentioned HMF data. Particularly, according to the first aspect of the invention, the data processing apparatus is adapted to independently or selectively handle each of event data arranged in time sequence by execution of the script. Identification information such as a label and ID can be attached to each piece of even data. Further, according to the invention, the line curve data indicating a time variable is represented by a pair of time sequential event data and a script. In this case, the time-sequential event data series of curve data is constituted by discrete time and value. A value of curve data at a given time is obtained by appropriate interpolation. It should be noted that execution of the script can alter the shape or profile of curve data.

Namely, in the first aspect of the invention, the data processing apparatus comprises an input in the form of the processor A that provides a sequence composed of events and a script. The events are data determining time-sequential occurrence of multimedia matter, while the script is a program modifying the time-sequential occurrence of multimedia matter. The inventive data processing apparatus further comprises the processor B operative when reference is made to the provided sequence for executing the script to rewrite the events, and an output in the form of the output section 2-6 that provides the sequence containing the rewritten events in response to the reference for modifying the time-sequential occurrence of the multimedia matter.

Preferably, the input affixes an identification code to an event for discriminating from each other, and the processor discriminatively processes the events according to the identification code during the course of execution of the script.

Preferably, the input provides a curve sequence containing a discrete series of events each being data determining a pair of a time and a value such that the curve sequence represents a time-variation of the multimedia matter, and the processor rewrites the value of each event so as to modify the time-variation of the multimedia matter. In such a case, the processor interpolates the value between successive events during execution of the script so as to convert the discrete series of the events into a continuous series of the events.

Preferably, the input provides a music sequence composed of music events determining time-sequential occurrence of music notes as one form of the multimedia matter.

Preferably, the processor comprises the separator 2-3 for separating the events and the script from each other which are initially bound to each other to compose the sequence, the interpreter 2-5 for interpreting the separated script to produce an executable program, and the rewriter 2-4 for executing the program to rewrite the separated events.

According to the second aspect of the invention, an link event can be embedded in a sequence of time-sequential event data. Another sequence can be referenced by this embedded link event to capture the referenced sequence. For example, instead of sequentially writing typical expression patterns, a sequence having the typical expression patterns can be prepared. This allows capturing of the typical expression pattern every time the same is needed by referencing the same. Further, by switching between the sequences identified by the link event, a desired sequence can be captured for data editing without restriction. In this case, according to the invention, a sequence in which event data constituted by time and value are arranged in time sequence is represented in the form of curve data. A plurality of link events for referencing other curve data are placed in the time-sequential event data of this sequence, hence plural pieces of referenced curve data can be composited with each other. This allows reuse of the generated curve data and, at the same time, shared use thereof. For example, general-purpose attenuation curve data and oscillating curve data can be composited with each other by a link event to provide curve data for desired time-variable parameters such as for pitch bend and volume.

Namely, in the second aspect of the invention, the data processing apparatus comprises an input that provides a plurality of sequences each being composed of events which are data determining time-sequential occurrence of multimedia matter. One of the sequences contains a link event which is a secondary reference to another sequence. The inventive data processing apparatus further comprises a processor operative when a primary reference is made to said one of the sequences for extracting therefrom the link event, and for incorporating said another sequence referred to by the link event into said one sequence in place of the link event so as to form a composite sequence. An output provides the composite sequence in response to the primary reference for presenting the time-sequential occurrence of the multimedia matter.

Preferably, the input provides said another sequence in the form of a curve sequence containing a series of events each being data determining a pair of a time and a value such that the curve sequence represents time-variation of the multimedia matter. The processor incorporates the curve sequence into said one sequence so as to apply the time-variation to the time-sequential occurrence of the multimedia matter.

Preferably, the input provides said one sequence containing a first link event and a second link event, and provides a first curve sequence corresponding to the first link event and a second curve sequence corresponding to the second link event. The processor comprises a mixer operative when first time-variation represented by the first curve sequence and second time-variation represented by the second curve sequence overlap with each other for consolidating the first curve sequence and the second curve sequence into a composite curve sequence, and for concurrently consolidating the first link event and the second link event into a single link event to conform with the composite curve sequence.

Preferably, the input provides said one sequence in the form of a music sequence composed of music events determining time-sequential occurrence of music notes as one form of the multimedia matter, and provides the curve sequence representing time-variation of the music notes.

Preferably, the input provides said one sequence in the form of one music sequence composed of music events determining time-sequential occurrence of music notes as one part of the multimedia matter, and provides said another sequence in the form of another music sequence composed of music events determining time-sequential occurrence of music notes as another part of the multimedia matter. The processor incorporates said another music sequence into said one music sequence by means of the link event so as to present a whole of the multimedia matter.

According to the third aspect of the invention, a package for storing a plurality of sequences is prepared. Description of this package is specified as the new format, so that this package can be handled as a file. Consequently, the structure of sequences stored in the package can be passed to another device. Further, the package can store a package-script separated from the sequence. The package having this separate package-script is available as a plug-in module. Namely, not only event data but also functional definitions can be provided by the package-script. Still further, in the HMDM according to the invention, a plurality of packages are stored as arranged in a desired order. At loading of the package, the package-script is executed. A dictionary of each package generated at the execution of the package-script and a temporary dictionary generated at referencing of the sequences are searched in the predetermined order when a subroutine is read at the execution of the script. A subroutine having a name found first is executed, so that use of the script between packages can be performed with flexibility. For example, plugging of a package can replace a prepared subroutine with another having the same name. At the same time, if there is a link to a sequence, linking is settled by searching for the sequence by the name thereof in the order in which the packages are arranged.

Namely, in the third aspect of the invention, the data processing apparatus comprises an input that loads a package which is a file containing at least one sequence and a plurality of scripts. The scripts include a package-script bound to the package and a sequence-script bound to the sequence. The sequence is composed of events which are data determining time-sequential occurrence of multimedia matter while the sequence-script is a program modifying the time-sequential occurrence of the multimedia matter. The inventive data processing apparatus further comprises a processor operative when the package is loaded for executing the package-script to initialize the file, and being operative when reference is made to the sequence for executing the sequence-script to rewrite the events. Further, an output provides the sequence containing the rewritten events in response to the reference for modifying the time-sequential occurrence of the multimedia matter.

Preferably, the input loads a plurality of the packages each of which contains the package-script having definition of a subroutine while one of the scripts belonging to the packages has a call command for a subroutine. The processor comprises a sorter that sorts the provided packages to define a search order, an initializer that executes each package-script to prepare a dictionary of a subroutine according to the definition thereof, and a searcher operative when said one script is executed for searching the dictionaries of the respective packages according to the defined search order to call the subroutine specified by the call command. Preferably, the sorter can exchange, add and delete the packages to arrange the search order.

Further, the inventive data processing apparatus comprises an input that provides a plurality of packages each of which can accommodate therein at least one sequence. The sequence is composed of events which are data determining time-sequential occurrence of multimedia matter. One sequence belongs to one package containing a link event which is a secondary reference to another sequence belonging to another package. A sorter sorts the provided packages to define a search order. A processor operates when a primary reference is made to said one sequence for extracting therefrom the link event, then searching the packages according to the defined search order to find said another sequence referred to by the link event, and incorporating said another sequence into said one sequence in place of the link event so as to form a composite sequence. An output provides the composite sequence in response to the primary reference for presenting the time-sequential occurrence of the multimedia matter. Preferably, the sorter can exchange, add and delete the packages to arrange the search order.

According to the fourth aspect of the invention, the package having the HMF format as shown in FIG. 3(*a*) and 3(*b*), different from the conventional SMF format, is made coexistent with the conventional SMF data, thereby realizing compatibility between the HMF data and the conventional SMF data. To be more specific, the packages of HMF format are distributed in a track for storing MIDI data as meta-events described in a text form, for example. Alternatively, the meta-events are stored in a track other than tracks in which the SMF data is stored. Thus, the conventional SMF data and the HMF packages are included in the same music data. Because the conventional reproducing machine ignores the HMF packages, which are meta-events, the conventional reproducing machine reproduces only the stored MIDI data. On the other hand, the reproducing machine that can reproduce the data of HMF format extracts only the data of HMF format for reproduction. Thus, the compatibility is established between the data of HMF format and the data of SMF format.

Namely, in the fourth aspect of the invention, the data processing apparatus comprises an input that provides mixture of a first sequence having a simple format and a second sequence having a complex format. The first sequence is composed of events alone, while the second sequence is composed of events and a script. The events are data determining time-sequential occurrence of multimedia matter while the script is a program modifying the time-sequential occurrence of the multimedia matter. A processor operates when reference is made to the first sequence for simply processing the same, and operates when alternative reference is made to the second sequence for executing the script to rewrite the events. An output provides the second sequence containing the rewritten events in response to the alternative reference for modifying the time-sequential occurrence of the multimedia matter.

Preferably, the input provides the mixture of the first sequence and the second sequence in a serial track such that the first sequence and the second sequence are interleaved with one another.

Preferably, the input provides the mixture of the first sequence and the second sequence in parallel tracks such that the first sequence is allotted to one of the parallel tracks while the second sequence is allotted to another of the parallel tracks.

Preferably, the input provides the first sequence and the second sequence, each being composed of music events determining time-sequential occurrence of music notes as a specific form of the multimedia matter.

The following describes the present invention in detail. The data processing apparatus associated with the invention for processing HMF data can be realized by computer software.

First, FIG. 3(*a*) shows a typical overall image of a static data structure of the HMDM to be processed by the data processing apparatus according to the invention. A structure of a typical package stored in the HMDM is shown in FIG. 3(*b*). A structure of a typical sequence stored in the package is shown in FIG. 3(*c*).

As shown in FIG. 3(*a*), the HMDM is composed of a plurality of packages 10 through 13. These packages include a performance package 10 in which performance data for one piece of music in general is stored, plug-in packages 11 and 12 which collect useful and convenient phrase fragments and subroutine definitions , and a system package 13 in which basic data/subroutine definitions are stored. The package shown in FIG. 3(*b*) stores a package-script 32 and three sequences 21, 22, and 23. It should be noted that one package is generally composed of zero or one package-script and zero or more sequences. That is, in the package, either the package-script or the sequence may be eliminated.

As shown in FIG. 3(*c*), each sequence is structured such that an event list 30 and a script 31 for describing modification of the event list 30 are bounded with each other. This structure is an important feature of HMF. The script 31 is a program for indicating a procedure of modifying the event list 30 to optimize or update each event. As shown in FIG. 3(*c*), the script 31 bounded to the event list 30 is referred to as a sequence-script. As shown in FIG. 3(*b*), an isolated script 32 arranged separately from the event list in the package is referred to as a package-script.

Further, the event list describes a plurality of MIDI events listed in terms of time. IN the HMF, a link event can be placed in this event list. The link event allows the HMF to realize the description of music performance data structure more flexibly than the conventional SMF track model in which a plurality of performance parts are represented by a plurality of tracks. When a sequence is referenced for reproduction, the sequence-script is applied to the event concerned and a result thereof is given. Thus, the substance of performance data is placed in the event list and modification of the substance is described by the script.

The following describes a manner in which one package in the HMDM is generated from the HMF. In processing the HMDM, about 200 basic commands (a command set) are defined. The HMDM receives execution codes in which these commands and values are arranged in a desired order to execute the commands sequentially. The commands include those for accessing and changing the contents of the HMDM. Rules for describing these execution codes in a text form are defined. These rules are associated with text notation of the commands, values and arguments given to the commands. A programming language defined by these rules is referred to as a Hyper Media Executable (HME).

To perform HMDM processing, a text written in HME is read, and execution codes are generated. The system is provided with a capability of executing the execution codes. The program for changing the contents of HMDM is generated by a method in which the HME text is written directly or a method in which the program is written by a high-level programming language. Alternatively, the program may be automatically generated by the system through graphical interface without making the user conscious of the writing processing. The operating program, checks the contents of the text. If the contents of the text are based on HME, the text is directly read and the execution codes are executed. Alternatively, a compiler designated by the text of the script is called to convert the text into the HME. The converted HME is read to execute the execution codes. It should be noted that, for determination of the format, the name of the compiler is written on the first line of the text. It will be apparent that the determination of the format may be made in another way.

The HME is designed to perform any edit operations on the HMDM. The edit operations are performed on a blank package having no content to build a package having various contents. Since the HME can be described in text, the HME text can be filed with ease. The resultant file may be simply a text file. Alternatively, the HME text may be stored in an SMF file by use of an appropriate SMF meta-event. A procedure of the edit operations is conducted such that all elements included in the package are sequentially registered by HME. This procedure is filed in text form, so that the contents of the package can be recorded in a file.

The HMF is a file describing the contents of one package stored in the HMDM. The HME is used to describe the contents of the package. The following explains restoration of a package from text description. The text description has a following structure. For the convenience of explanation, the following example shows not the actual HME itself but a concept thereof. The step numbers are attached to the left side of the example for the convenience of explanation, and hence these step numbers are not included actually.

"HME" language 1.00 Version

1. Create a blank package and let it be p.
2. Create a blank part sequence and let it be s.
3. Create event e. Let time of e be 100. Let contents of e be "91 40 40." Store e into s.
4. Create event e. Let time of e be 150. Let contents of e be "81 40 00." Store e into s.
5. Store s into p as name "seq_A."
6. Create a blank part sequence and let it be s.
7. Create event e. Let time of e be 300. Let contents of e be "91 51 40." Store e into s.
8. Create event e. Let time of e be 450. Let contents of e be "81 51 00." Store e into s.
9. Store s into p as name "seq_B."
10. Output p.

The contents of the event e are represented by a set of three byte data. When the first byte is "91", it denotes a note-on event. When the first byte is "81, " it denotes a note-off event. The second byte denotes a note number in hexadecimal notation. The third byte denotes a velocity in hexadecimal notation.

The following explains a manner in which the above-mentioned text is read at execution of the HMDM and is converted into execution codes. In HMDM processing, the system first recognizes remark "HME" at the head, and determines that this text is an HME text, thereby converting the same into execution codes. If another language is specified and external software for converting the HME text written in that language is specified, the system operates the external software to make the same process the body of the text, and receives the result in HME format.

The following describes a manner in which the system converts the HME text into execution codes. In step 1, a new blank package is created. This package will be allocated in memory but will not be registered as one of the packages in the HMDM. The created package is referenced by variable p. In step 2, a blank part sequence is prepared in memory. In steps 3 and 4, desired events are created, necessary parameters are set to the events, and the created events are stored in the part sequence. Actually, these steps are repeated by the number of events to be created. Consequently, the events are arranged in the part sequence. In step 5, the creased part sequence s is named and the named part sequence s is registered in the package p. IN steps 6, 7, 8, and 9, the same operations as mentioned above are repeated to create another part sequence, which is also registered in the package p.

Thus, two part sequences "seq_A" and "seq_B" have been registered in the new package with the contents restored. Subsequently, the procedure of creating part sequences and registering the created part sequences may be repeated to obtain a desired number of part sequences. Curve sequences are created and registered in generally the same procedure. The registration of the text for representing a package-script can also be carried out in generally the same manner. The package created last is added to the end of the HMDM package group. Alternatively, location of the last created package to be inserted may be left to discretion of the user. After building the packages and assembling them into the package group, the package-script is executed. As shown in the above-mentioned example, "executing" the description in HME allows a package having given contents to be restored from the HMF into the HMDM. Conversely, the contents of a package stored in the HMDM can be described in the HME to be filed in text form.

Figure 4:
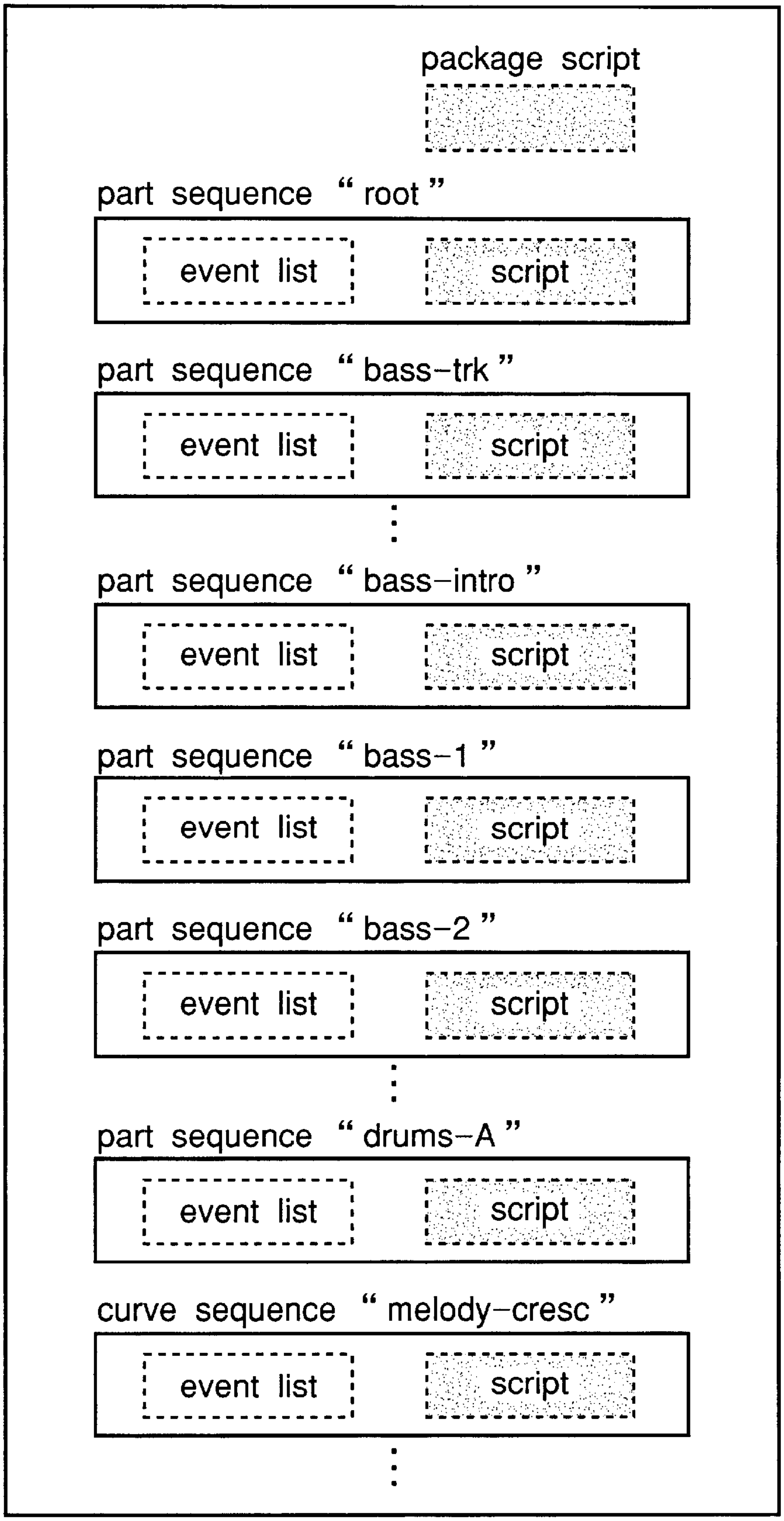
FIG. 4 is a diagram illustrating a data structure of an HMDM package in the data processing apparatus associated with the present invention.

The following describes the details of a package with reference to FIGS. 3(*a*) through 3(*c*) and 4. FIG. 4 shows a package named "song1". This package has one package-script and sequences named "root," "bass-trk," "bass-intro," "bass-1," "bass-2," . . . , "drums-A," and "melody-cresc."

Generally, one package has zero or one package-script and zero or more sequences. It should be noted that the sequences are not necessarily controlled in the order of the arrangement shown in the figure.

The package has the following roles. First, the package provides a unit in which HMF data is distributed. Namely, file save and file load operations are performed on a package basis. Normally, one piece of music performance data is distributed as one package. Such a package is referred to as a performance package 10. On the other hand, there are packages in which convenient phrase fragments and subroutine definitions are collected in its package-script. Such packages are referred to as plug-in packages 11 and 12. It should be noted that one sequence is passed as contained in a package. However, script sources can be exchanged as text files. Further, a package can store basic data/subroutines initially provided for the HMF system. The package used for this system operation is referred to as a system package 13.

In addition, an initialization script used at loading can be stored in a package. This script is the package-script 32 included in the performance package 10. The initialization for each music performance data is conduced by executing the package-script.

It should be noted that, in order to designate a given sequence, a name is used in the HMDM. One sequence in the package can have one unique name. This name is referred to as a sequence name. The sequence name is reserved when the package including the sequence name is saved in a file and thereafter loaded. It should be noted that no plurality of sequences having the same name exist in one package. If a sequence having an existing name is registered in the package, the old contents thereof are replaced by the new contents; namely, the existing sequence is overwritten by the new sequence.

In the performance package 10, one of the sequences in the package becomes a "root sequence." The root sequence denotes a sequence from which referencing is started. If the system is externally inquired for the contents of the root sequence, other sequences included in the package are referenced through the root sequence. Consequently, overall data about music performance can be obtained. The root sequence of the performance package is indicated by sequence name "root." Since the root sequence is also one of the ordinary sequences, the root sequence is created in generally the same manner as other sequences are created. It should be noted that, generally, the settings associated with the entire music performance data are placed in the script and event list of the root sequence.

The package-script contained in the performance package may provide shared subroutines for constituting the music performance data. Further, the initial settings for music can be also placed here as a script. It should be noted that any modification can be made on the event list by a sequence-script bound to a sequence having the event list.

The plug-in package is a collection of convenient phrase fragments and subroutine definitions. The user can load a plug-in package into the HMDM as a black box, thereby using ready-made sequences and subroutines. It will be apparent that the user can modify script contents or newly create a script.

The plug-in package has no root sequence. Storing one or more subroutine definitions in the package-script provides a "subroutine book." For example, it is assumed that subroutine "slide" is provided. When this subroutine "slide" is called to modify specified note events in a sequence, these note events can be rewritten to perform slide playing of guitar.

Also, the plug-in package provides an "accompaniment style book", for example. If a sequence of accompaniment patterns is defined, a request for the contents of the sequence by designating a chord as an argument provides an event list of modified accompaniment patterns with pitch converted according to the chord. Further, use of a sequence provides a phrase book, a curve data book, and so on. In this case, the sequence-script provides a method of modifying the phrases and curve data. For example, by attaching an argument to one sequence included in the phrase book, the contents of this sequence can be read with phrases modified in a variety of manners.

The system package realizes additional portions of the system functions, and is installed on primitive functions of the system. The system package has no root sequence, basic subroutines being provided by use of the package-script. By use of sequences, basic data such as typical accompaniment patterns is provided.

The following describes the sequence. The sequence is a unit of data structure providing the kernel of the HMF. The sequence is constituted by a pair of an event list and a script. The sequence is of two types; part sequence and curve sequence. The part sequence stores a series of 8-bit data or bytes indicating decimal 0-255, a note event having MIDI pitch, on-velocity or off-velocity, and a link event. The curve sequence stores an event indicating numerical values. It should be noted that the curve sequence has no link event.

Figure 5:
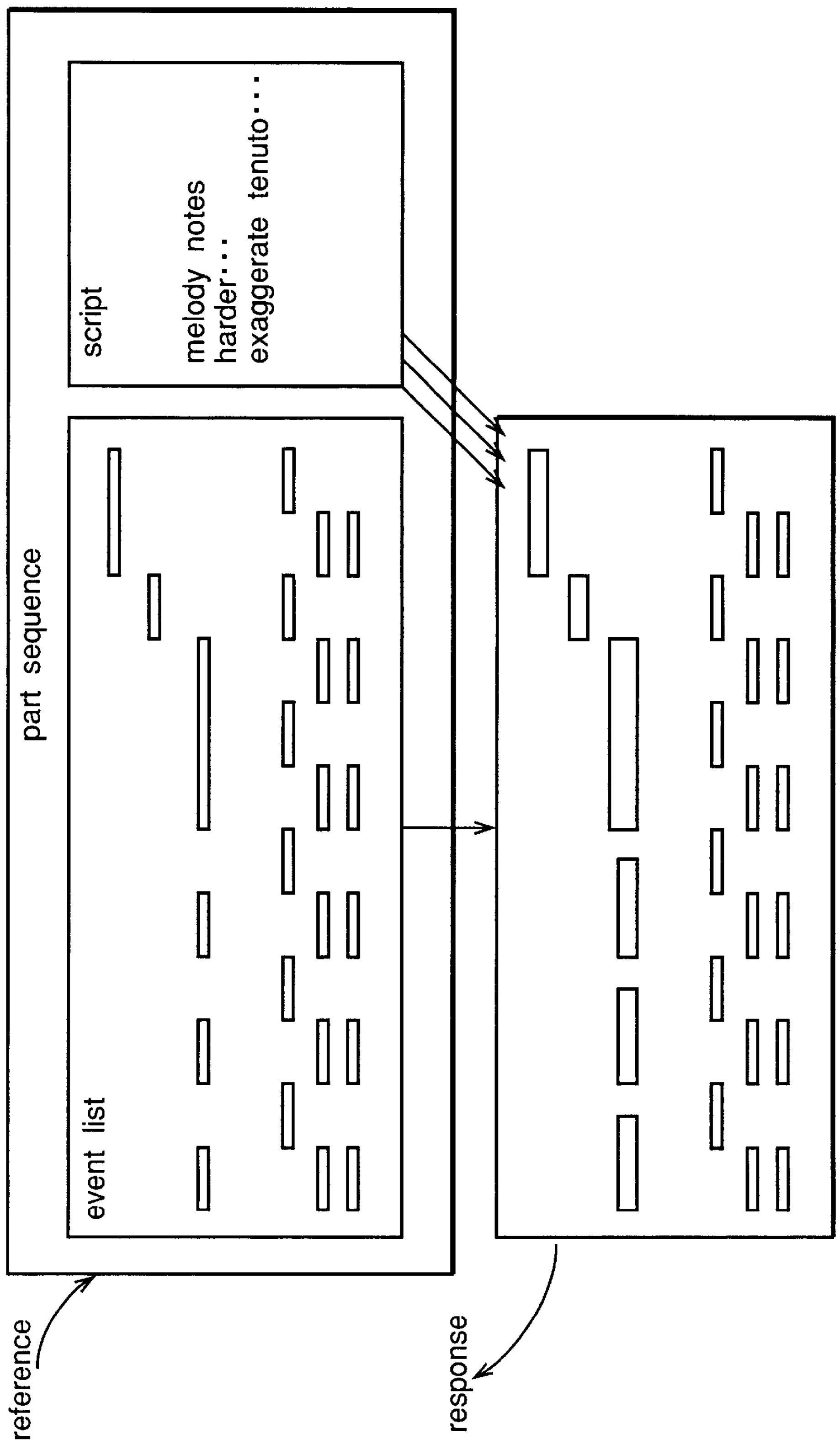
FIG. 5 is a diagram for explaining a sequence constituted by an event list and a script of HMDM in the data processing apparatus associated with the present invention.

Upon request for contents, the system makes a copy of the event list held in the sequence and executes the script to modify the copy of the event list. Then, the system outputs the modified event list. Namely, the original event list held in the sequence is reserved while the copy thereof is rewritten. For example, when reference is made to the part sequence shown in FIG. 5, "melody notes harder . . . " and "exaggerate tenuto" described in the script in the sequence are executed. Consequently, as shown in the figure, the velocity of each of the note events constituting the melody is increased as represented by a thick bar indicating the events, and, at the same time, the duration of the note events is prolonged. The melody is made harder and the tenuto is emphasized. The event list thus rewritten is returned as a response to the reference. In addition, an argument or parameter for control may be given as required. For example, an argument "10%" may be optionally designated, indicating "make the melody 10% harder."

The event list and the script constituting a sequence are entities independent both statically and dynamically. As a static data structure, both are separated from each other. Execution of the script and progression of music performance are completely different dynamic processes. This means that the script is not included in the event list and the script is executed separately from the progression of music performance. In the HMF, fragments of source music performance are held in the event list in the form of a MIDI event. Adjusting the argument of the script or replacing the script itself can vary the actual event in a variety of manners. This facilitates modification of a template, for example. The script is said to hold control commands that are applied to the event list. By looking at the script, the process of editing of that event list can be known. Namely, a sequence can be said to be music performance data that holds the editing process of this sequence.

The following explains a method of designating a sequence. In order to designate a particular sequence in the HMDM, both the package name and the sequence name are designated at the same time. The package name is unique in the HMDM and the sequence name is unique in the package. In the HMDM, a sequence may also be identified by its identification code. When new sequences are introduced to the HMDM by loading a package, the ID manager gives "ID codes" of which uniqueness is guaranteed in the HMDM to each sequence. Subsequently, desired sequences can be directly designated by these ID codes. Thus, the ID codes are unique not in the package but in the HMDM.

These ID codes are integer numbers but not necessarily serial numbers. Therefore, if a sequence is deleted, the ID codes of the remaining sequences remain unchanged. Once registered in the HMDM, the ID codes of the sequences remain unchanged until deleted from the HMDM. However, when encoding the package in the form of HMF, no ID code is reserved. When that package is later loaded into the HMDM, new ID codes are given to the sequences. Namely, this is handled as the registration of new sequences.

The following explains the details of the event list. The event list is a data structure arranged with a given number of events in time sequence. An event is a data unit that includes a set of start time information, duration information and label information, in addition to any of the following data:

byte series . . . series of 8-bit (byte) data indicating decimal 0-255;

note event . . . an event having MIDI pitch, on-velocity, and off-velocity;

link event . . . an event specifying a link, the event being of two types of part link event and curve link event; and numeric value.

The event list holding the above-mentioned events has the following characteristics:

1. One or more labels can be attached to each event. Also, an ID code is may be attached to each event.
2. A link event is provided.
3. The event list can also be used to present profile data indicating time-variable curves.

Figure 6:
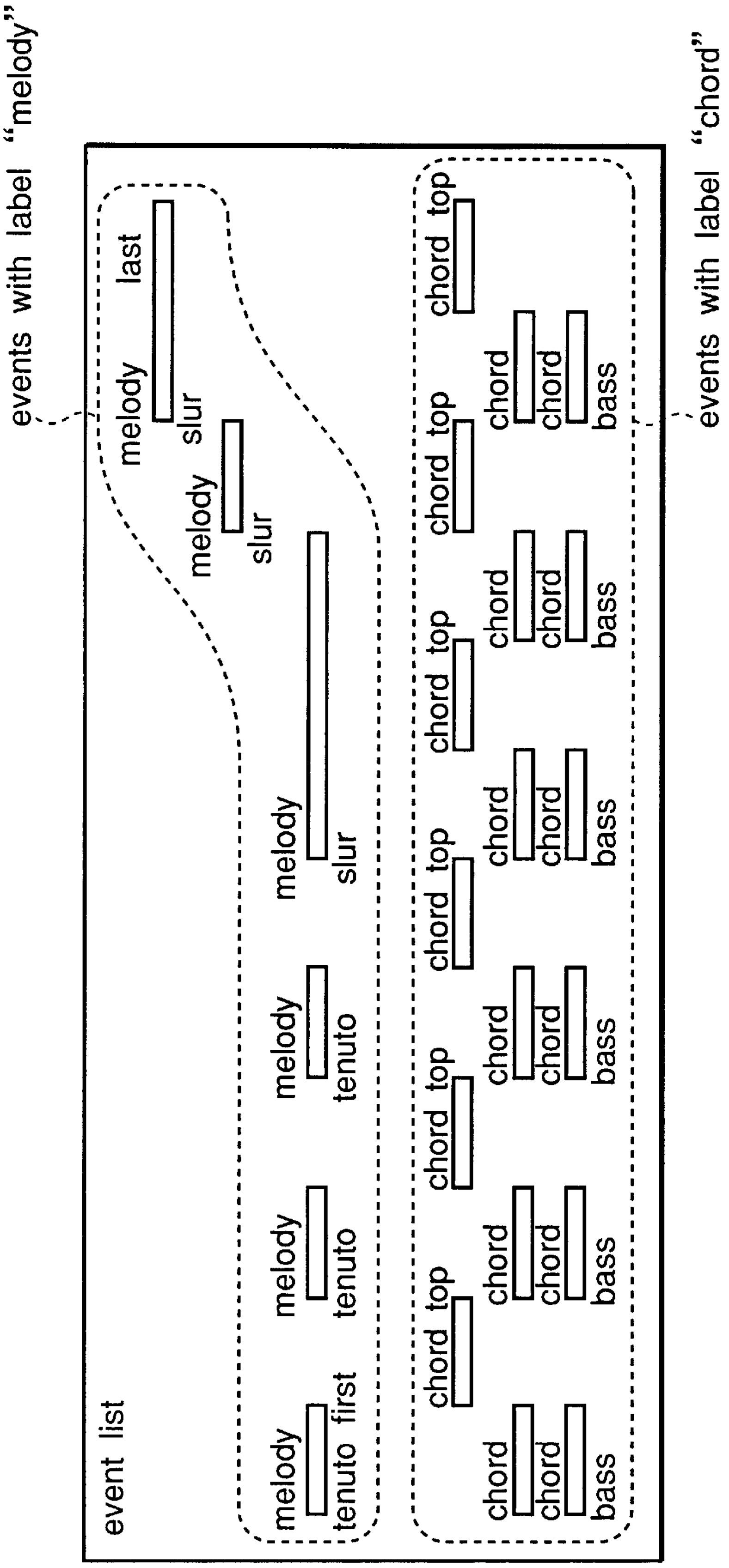
FIG. 6 is a diagram for explaining an event list having labeled events of HMF in the data processing apparatus associated with the present invention.

The label is attached to identify each event in the event list. The user can attach labels arbitrarily. The events may also be identified by ID codes. An example of a labeled event list is shown in FIG. 6. Each event in the event list may have any number of labels consisting of any character string. An event having no label is also permitted. In the example of FIG. 6, the event in the upper left corner is attached with three labels "melody," "tenuto," and "first." In the HMDM, the events can be designated by use of these labels.

Labeling corresponds to the object event selecting operation of the conventional sequencer software. In the conventional sequencer software, the desired number of events to be edited are designated by a mouse or another pointing device, and the events thus designated are edited. Labeling of the events is equivalent to recording the selection thereof.

Therefore, designating of the label can reproduce the selection pattern of the events. This facilitates the processing of the events. For example, designation of the events labeled "melody" shown in FIG. 6 is equivalent to specify a group of the events enclosed by a dashed line shown in the upper half of the figure by a mouse or the like pointing device. Likewise, designation of the events labeled "chord" is equivalent to enclose the events by a dashed line shown in the lower half of the figure by a mouse or the like pointing device. It will be apparent that a plurality of labels may also be designated such as "melody" and "tenuto." Each label is reserved even if the sequence is encoded into the HMF format and decoded later. In FIG. 6, music performance by both hands for playing the piano is stored in one sequence. Labels such as "melody," "chord," and "bass" are assigned to the events, respectively. Therefore, such descriptions as "harder for the events labeled" 'melody' and "harder for the events labeled 'bass'" can be made in the script.

Figure 7:
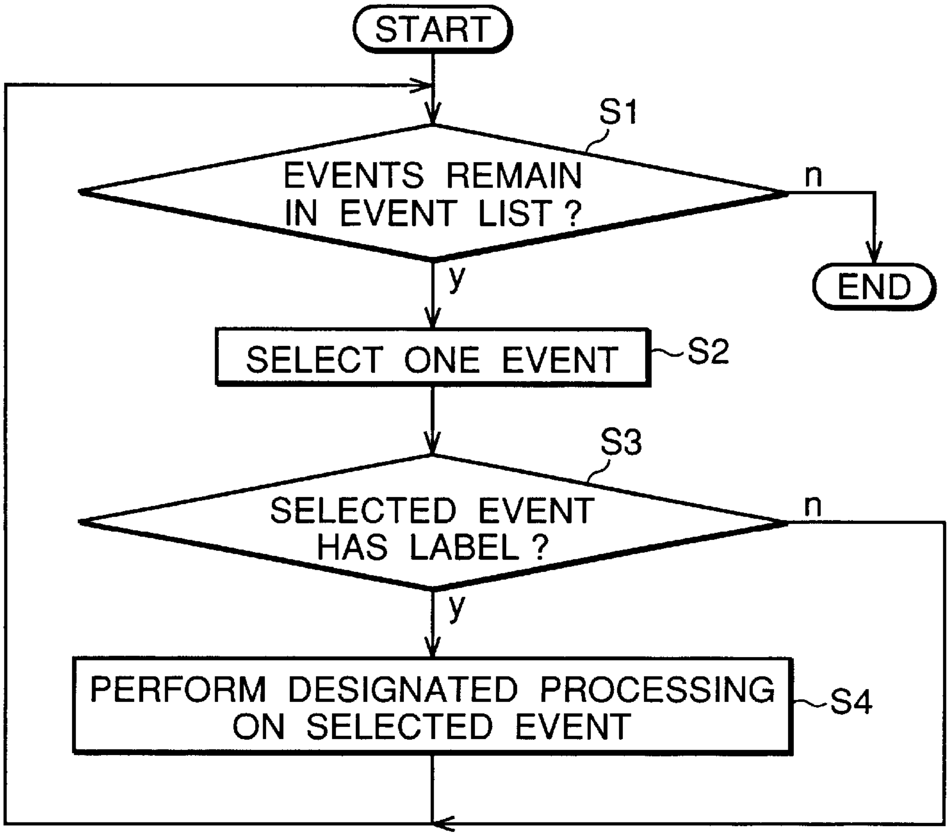
FIGS. 7(*a*) and 7(*b*) are a diagram illustrating a flowchart of event rewrite processing and an example of an event list in the data processing apparatus associated with the present invention.

FIG. 7(*a*) shows a flowchart of the processing for selectively rewriting labeled events. The following explains this processing with reference to an event list shown in FIG. 7(*b*). In this example, an event having label "xxxx" is rewritten. In particular, an example in which label "xxxx" is "melody" will be explained. When the event rewrite processing starts, it is determined, in step S1, whether events remain in the event list. Immediately after the processing has started, all events in the event list shown in FIG. 7(*b*) remain. Therefore, the decision is YES (y) and the process goes to step S2. In step S2, one event is selected. In this example, a first event EventA1 is selected. In step S3, it is determined whether the designated label "melody" is attached to the selected event. Since EventA1 is attached with label "melody" as shown in FIG. 7(*b*), the decision is YES (y) and the process goes to step S4. In step S4, specific processing such as making sounding harder performed on the event and the process goes back to step S1.

The processing operations of steps S1 through S4 are repeated. This time, EventC1 is selected. Since EventC1 is not attached with label "melody," the decision is NO (n) in step S3 and the process goes back to step S1. Likewise, the processing operations of steps S1 through S4 are performed on the sequentially selected events listed in FIG. 7(*b*). When all events in the event list shown in FIG. 7(*b*) have been processed, decision is NO (n) in step S1, upon which the event rewrite processing comes to an end. Thus, the event rewrite processing has been performed on EventA1 and EventA2 attached with is label "melody."

Figure 8:
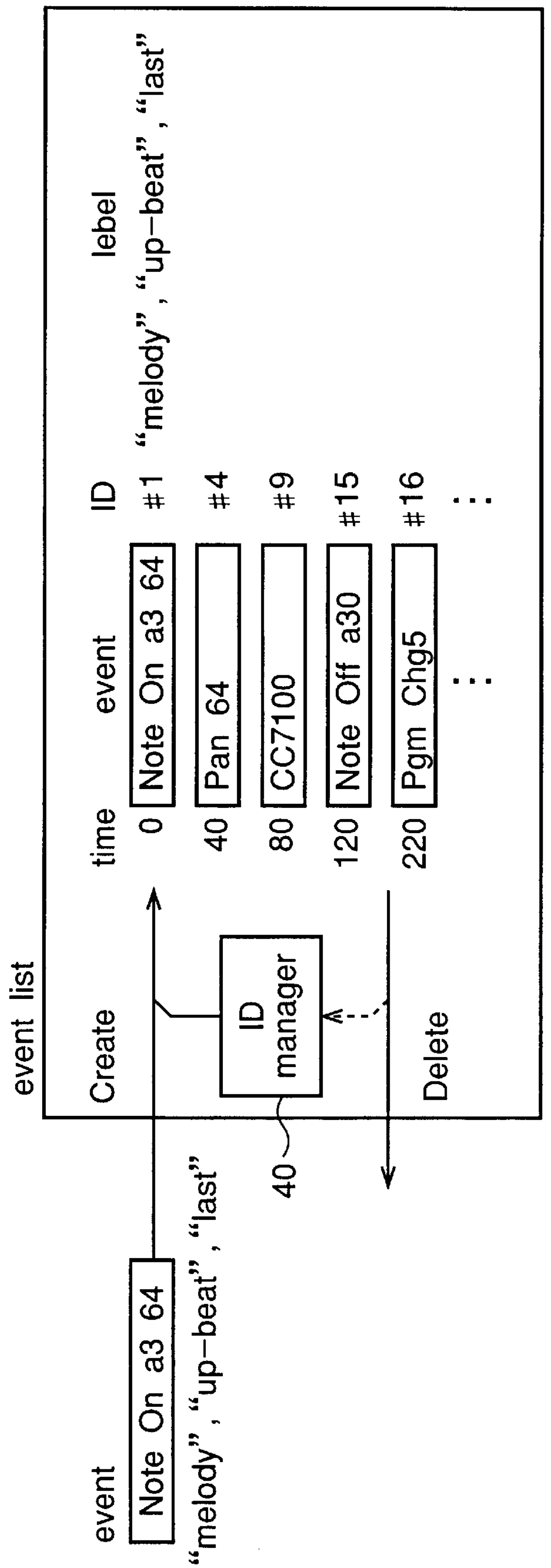
FIG. 8 is a diagram for explaining a mechanism for attaching an ID code of an HMF event in the data processing apparatus associated with the present invention.

The HMF sometimes uses ID codes in an auxiliary manner to identify the events in the event list. This auxiliary mechanism is for taking balance with the script language. Due to a tradeoff with script processing speed and complexity, it is possible that a mechanism (such as associative matrix) used for the event identification by label cannot be provided for the language. In such a case, it becomes necessary to identify the events by integers, the most basic data, so that ID codes are used in an auxiliary manner. FIG. 8 shows an example of the mechanism for attaching ID codes to events. When new events are added to the event list by the user, ID codes of which uniqueness is guaranteed in the event list are assigned to the new events. Subsequently, any event can be designated directly by these ID codes. For example, in FIG. 8, event "NoteOn a3 64" is added to time 0. When registering this event, an ID manager 40 gives numeric value "1" to this event, which is not used by any other events at this point of time. Subsequently, only setting id=1 in this event list uniquely designates "NoteOn a3 64" of time 0.

It should be noted that the ID codes are integers and need not be serial numbers. Therefore, deletion of an event will not change the ID codes of the remaining events. Once registered in the event list, the ID codes remain unchanged until events are deleted. For example, in FIG. 8, the event designated by ID code 16 is deleted, the ID codes of any other events remain unchanged. It should be noted, however, that, if an event is deleted from the event list and the deleted event is registered again, the same event is attached with a new ID code different from the old one. Namely, re-registration of a deleted event is handled as registration of a new event.

Figure 9:
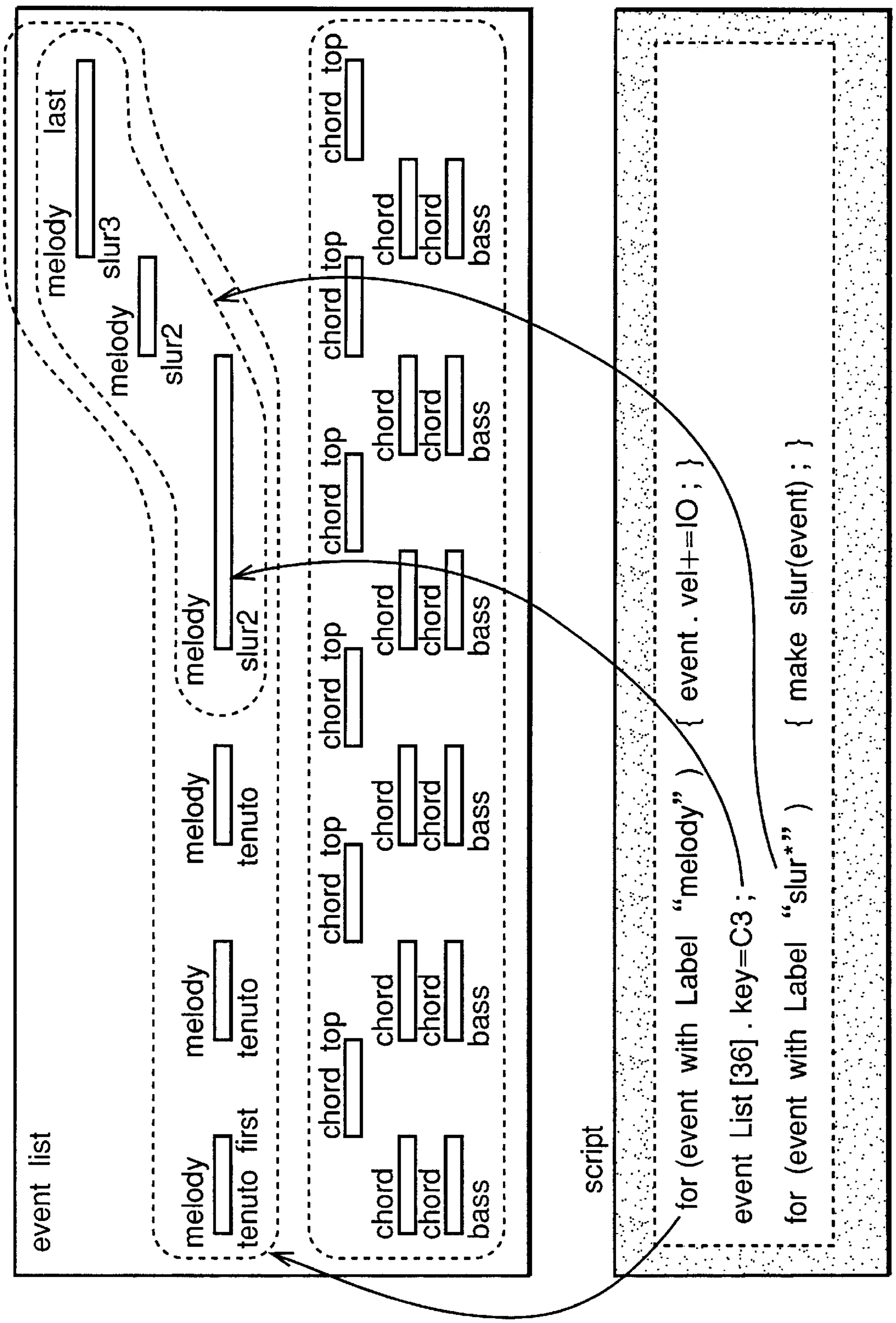
FIG. 9 is a diagram for explaining a relationship between a script and an event list of HMF in the data processing apparatus associated with the present invention.

The following explains the script. The script is a program describing a procedure of modifying the event list as explained above. The script sets object events to be processed and describes the repetition of operations to be performed on the object events. The event to be processed is designated by use of label or ID code as explained above. Alternatively, a time range is set and the events within this time range are collectively designated. FIG. 9 shows an example of script contents in relation to the event list. The first line of the script shown in the figure commands increase of velocity by 10 for the events labeled "melody." The second line designates note number C3 for the pitch of the event of ID 36. The third line describes slur processing for the events with label beginning with "slur." It should be noted that an asterisk (*) attached to "slur" on the third line denotes a wild card. "slur*" includes labels "slur 1," "slur 2," "slur 3," and so on.

It should be noted that the script notation shown in FIG. 9 is rather conceptual, and is hence different from that used in the actual programming language in the present invention. Operations to be performed by the script on an event that has been set include reading of the contents of the event, determination of the type of the event, changing of values in the event, deletion of the event, consolidation of a new event, and addition, deletion, or changing of the label of the event. For the script language, a low-level language such as an assembler can be used. In this case, the script can be described directly in this language. Alternatively, a high-level language may be designed while preparing a compiler for the designed language.

The script incorporated in each sequence is referred to as a sequence-script. The sequence-script makes description closely associated with the contents of a corresponding event list. Generally, in the sequence-script, many event list editing commands for executing modifications on particular events are written along with iterations and conditional branches. It should be noted that the sequence-script allows definition of subroutines therein.

A script registered in each package separately from the event list is referred to as a package-script. The package-script is shown on the top section of FIG. 4, for example. Every time a package is loaded, the package-script is executed once. The definitions of general-purpose subroutines are given beforehand by this package-script. This makes new subroutines available simply by loading the package. Hence, the package list consists of the initial settings necessary for using this package and the general-purpose subroutine definitions. The subroutine definitions are accessible also from outside.

Figure 10:
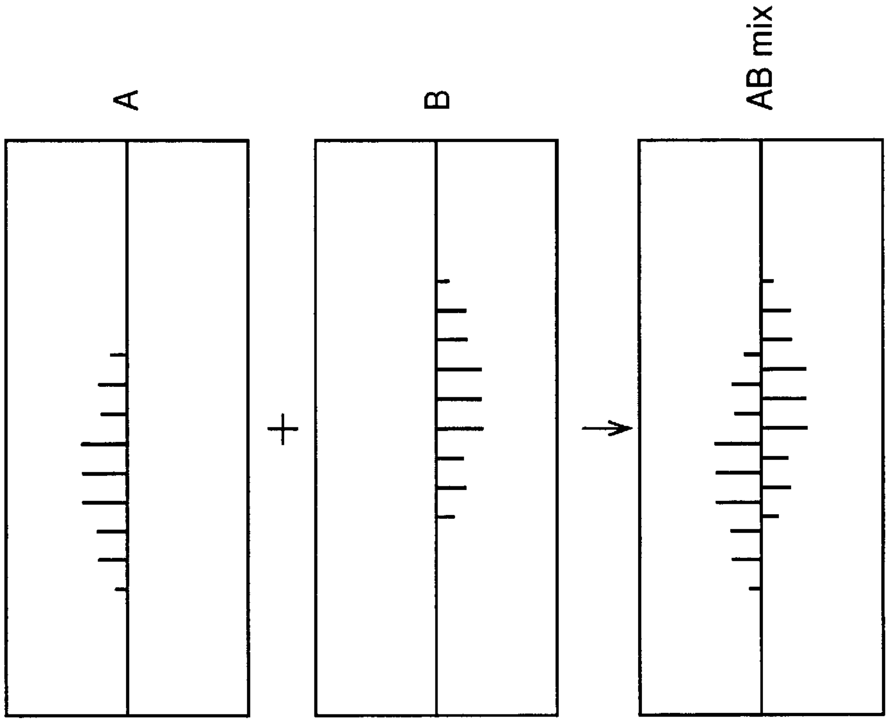
FIGS. 10(*a*) and 10(*b*) are a diagram for explaining a difference between SMF and HMF curve information.
Figure 10:
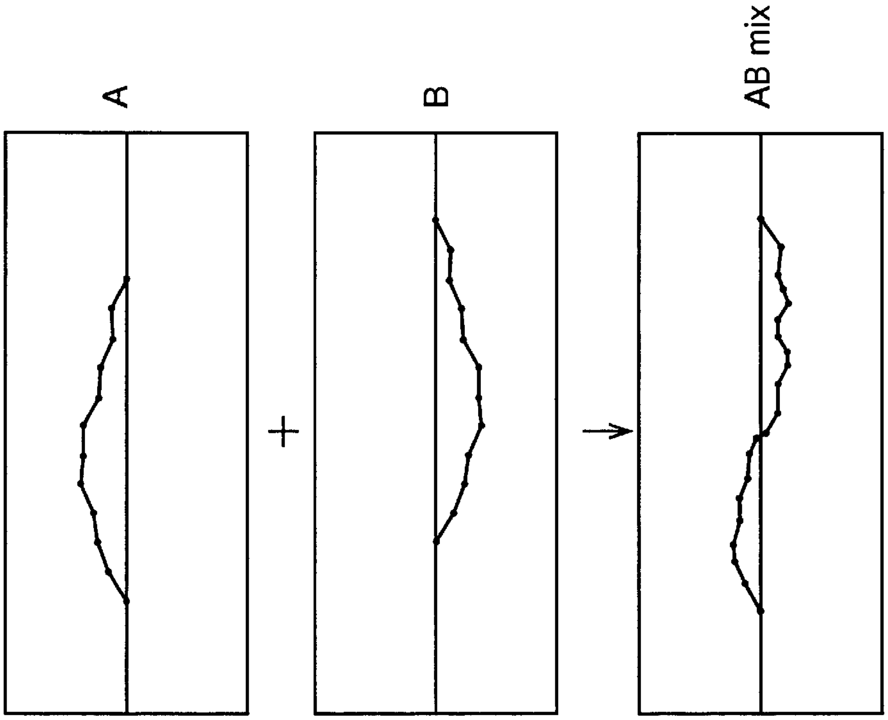

The following explains curve data, one of the significant features of the present invention. A time-variable curve for changing pitch bend and volume is data which varies continuously in time axis. Data defining the time-variable curve in the conventional SMF is represented by a discrete series of specific events. For example, by a discrete event data series shown in A of FIG. 10(*a*), the value time-varying continuously is represented. When an attempt is made to create the characteristic of a new time-variable curve by adding the event data series shown by A and another event data series shown by B of FIG. 10(*a*), simple mixing of these event data series together may not provide an exact variation characteristic obtained by correctly adding individual curves as shown in ABmix of FIG. 10(*a*). Therefore, in the HMF, the curve data is defined in the form of a folded line data, and a framework for the operation is given thereto as shown in FIG. 10(*b*). When the curve data is defined as shown, adding the line data shown in A of FIG. 10(*b*) and the line data shown in B of FIG. 10(*b*) together provides a new curve data as shown in ABmix in shown in FIG. 10(*b*). This allows abstracting of every kinds of time-variable data such as volume and tempo. Further, this curve data becomes exchangeable between different processors as it is. This curve data is stored in a sequence indicated by curve "melody-cresc" shown in FIG. 4, for example. The curve data is given as a kind of a sequence which is referred to as a curve sequence. Namely, the curve sequence is a sequence actually representing a time-variable curve.

Figure 11:
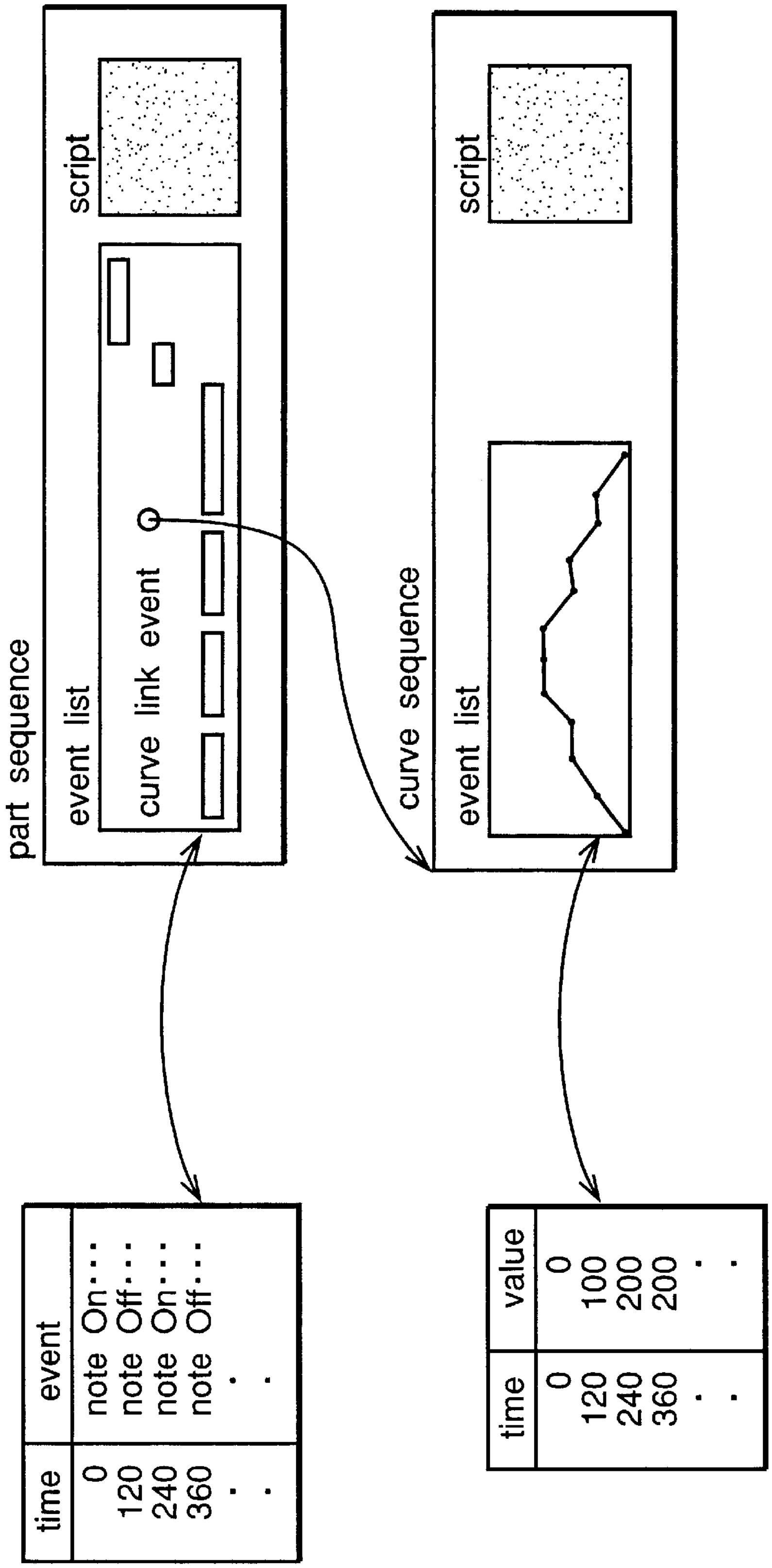
FIG. 11 is a diagram illustrating a structure in which curve data is held in the data processing apparatus associated with the present invention.

This curve sequence is shown in FIG. 11. As shown, in the part sequence, a MIDI event series is held in the event list in the order of time. On the other hand, in the curve sequence, a pair of time and value at each variation point of the curve is stored by use of the event list. It should be noted that the value of the curve data at a given time between the events is obtained by an appropriate interpolation method, for example linear interpolation. The contents of a curve sequence are referenced by a link event. A curve link event for referencing the curve sequence is placed at a desired time in the part sequence. This curve link event can include curve identification information such as the name of the curve sequence and designation information for designating application of this curve to volume or pitch.

No curve is fixed to a particular control parameter. For example, the curve data for pitch bend can be rewritten to the curve data for volume variation. It should be noted that the curve data is a transform function from time to value. Based on this, it becomes practical that the value at a time is obtained, MIDI events at appropriate intervals are generated from the curve, a curve sequence is inversely generated from an existing MIDI event series, and so on. Consolidation of curves to each other is also defined, allowing superimposition of music expressions by curves. The operation for deforming a curve sequence can be performed in generally the same manner as editing the event list in a part sequence.

Figure 12:
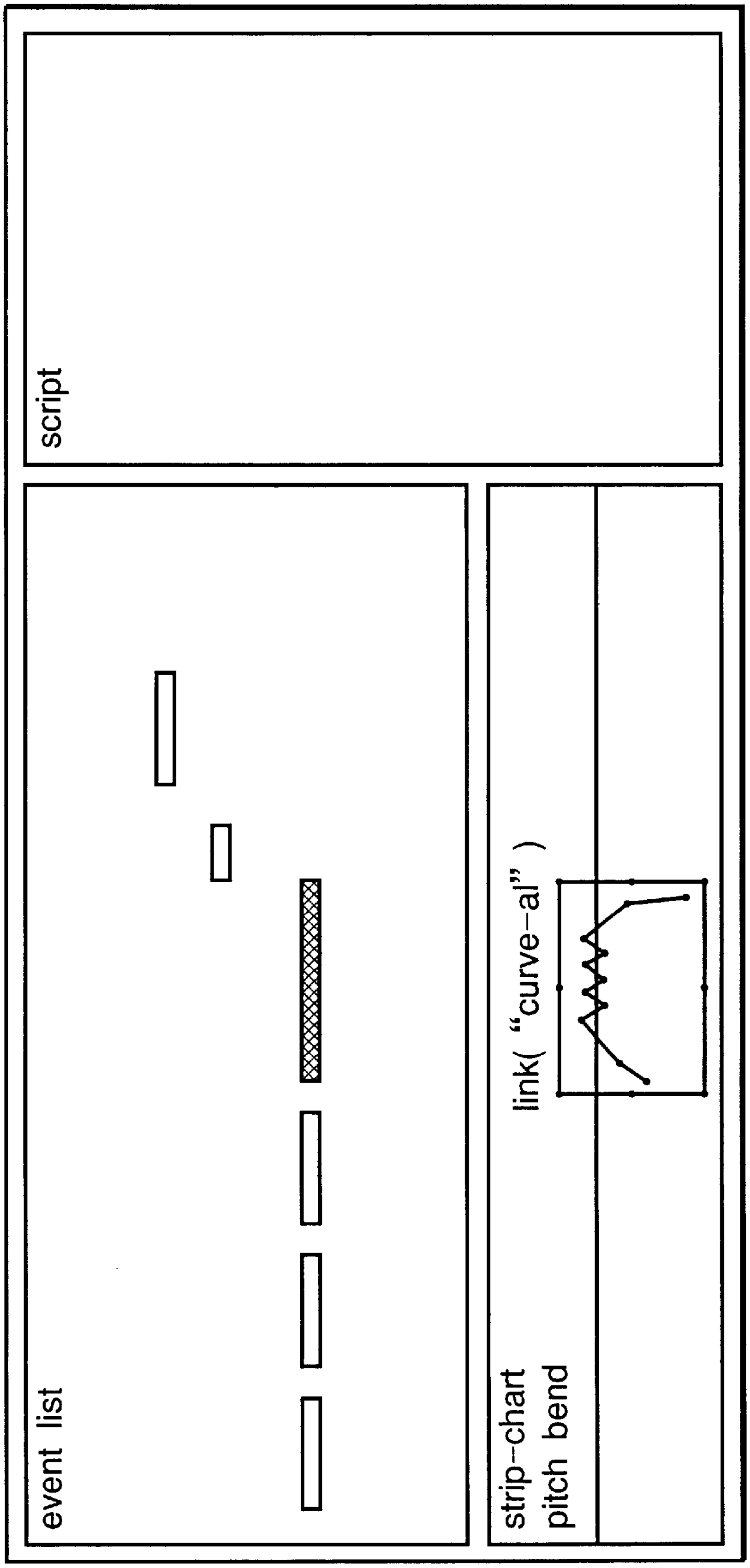
FIG. 12 is a diagram illustrating a usage example of the curve data of HMF for pitch-bending of musical tone in the data processing apparatus associated with the present invention.

The following explains an example in which curve data is used to apply delicate expression to pitch bend with reference to FIG. 12. FIG. 12 shows that the user has captured curve data called "curve-a1" into a strip chart of pitch bend. From this curve, the system automatically generates pitch bend events at appropriate intervals, and inserts the generated events into a MIDI event series. In this case, if the user alters the shape of the curve data "curve-a1," the system regenerates the pitch bend events.

Further, a script can be attached to a curve sequence. Executing the script at the time of reference can rewrite the original profile, perform interpolation between the rewritten events, and obtain the final curve data. When a curve is referenced by a curve link event, the script of the sequence including the curve link event can be executed to rewrite the curve. Further, labeling each of the points of the curve data can selectively rewrite the data at each point. This facilitates altering of curve variation characteristics. It should be noted that, in the curve data, the value of a given time is obtained by performing appropriate interpolation. This allows reverse generation of discrete event series at appropriate intervals from the curve line data.

As described above, according to the first aspect of the invention, the inventive method of processing data by means of a processor performs the steps of providing a sequence composed of events and a script, the events being data determining time-sequential occurrence of multimedia matter, while the script being a program modifying the time-sequential occurrence of multimedia matter, operating the processor when reference is made to the provided sequence for executing the script to rewrite the events, and providing the sequence containing the rewritten events in response to the reference for modifying the time-sequential occurrence of the multimedia matter. Preferably, the step of providing affixes an identification code to an event for discriminating from each other so that the processor can discriminatively process the events according to the identification code during the course of execution of the script. Preferably, the step of providing provides a curve sequence containing a discrete series of events each being data determining a pair of a time and a value such that the curve sequence represents a time-variation of the multimedia matter, and the processor is operated to rewrite the value of each event so as to modify the time-variation of the multimedia matter. Preferably, the processor is operated to interpolate the value between successive events during execution of the script so as to convert the discrete series of the events into a continuous series of the events. Preferably, the step of providing provides a music sequence composed of music events determining time-sequential occurrence of music notes as one form of the multimedia matter.

The following explains a sequence link event. A sequence link event can be placed in the event list of a part sequence. The sequence link event designates another sequence (a part sequence or a curve sequence). The sequence link event has a role of commanding the capture of a sequence designated by the link event after the time of that sequence link event.

Figure 13:
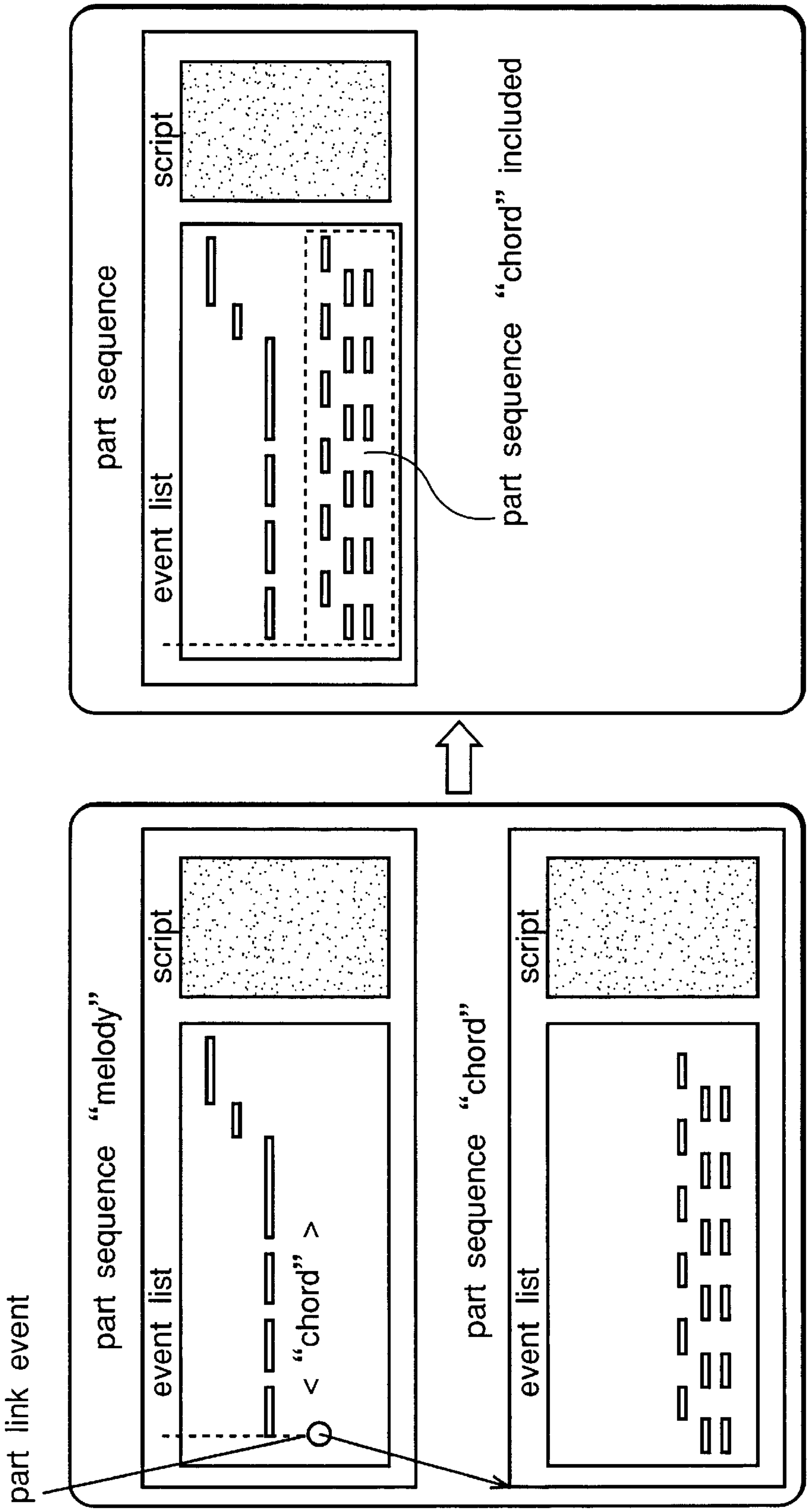
FIGS. 13(*a*) and 13(*b*) are a diagram for explaining a link mechanism of HMF in the data processing apparatus associated with the present invention.

For example, in FIG. 13(*a*), a sequence link event to a part sequence "chord" is placed at a location of time t of the event list of a part sequence "melody". When the complete part sequence "melody" is obtained by executing the script, the event list is modified. When the script has been executed, the sequence link event is settled or resolved, thereby capturing the part sequence "chord" into the part sequence "melody". Thus, as shown in FIG. 13(*b*), the complete or actual part sequence "melody" that consolidates the part sequence "chord" is obtained. This processing is not performed as music performance goes on but performed when an attempt is made to get the contents of the part sequence "melody."

Originally, an event list is a collection of MIDI events with time stamps. The MIDI events in an event list are always outputted as MIDI data. A sequence link event is placed in the event list but is not transmitted to MIDI output, only indicating a link between sequences.

It should be noted that, as explained before, the link is not settled at reproduction of the musical tones. The link indicated by a link event only statically indicates the link between sequences. The process of link settlement goes on when the contents of a part sequence are referenced regardless of the music performance process. It should also be noted that, when the contents of a sequence are referenced, an argument can be also passed.

Figure 14:
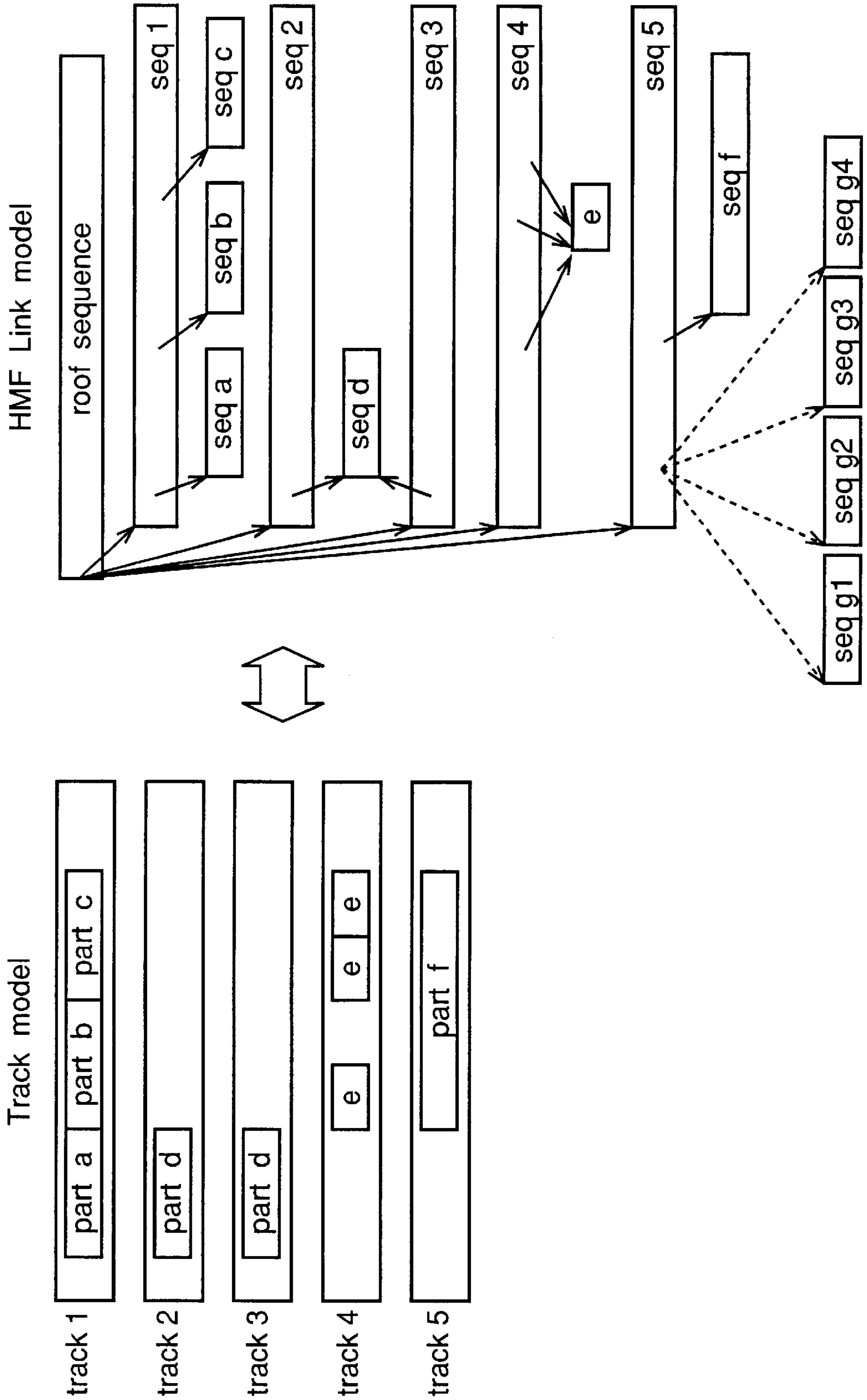
FIGS. 14(*a*) and 14(*b*) are a diagram for explaining an SMF track model and an HMF link model in comparison.

The link mechanism explained above can represent the music performance data structure of a track model employed by a general sequencer software program. In addition, the link mechanism allows music performance data to be exchanged between a plurality of sequencer software programs, including information about the hierarchical structure of the performance data. No conventional SMF track model can provide such capabilities. For example, FIG. 14(*a*) shows a data track model having five tracks track 1 through track 5. As shown in FIG. 14(*b*), this track model can be represented in a link structure in which five sequences seql through seq5 are captured at time 0 of the root sequence.

In the conventional track model shown in FIG. 14(*a*), phrase fragments are arranged in each track. This structure is represented by placing a link event at an appropriate time of a sub sequence (a sequence other than the root sequence) as shown in FIG. 14(*b*). For example, in FIG. 14(*a*), part a, part b and part c are placed in track 1. This state can be represented by placing a link event to seq a, seq b, and seq c at an appropriate time of the corresponding seq1 as shown in FIG. 14(*b*). Further, as with some sequencer software programs, a structure having hierarchical sequences can be represented in the same manner by using the link events.

Unless linked, sub sequences do not contribute to MIDI output. By preparing many sequences each having one typical expression pattern, a desired one of the prepared sequences can be linked for use. Hence, the link framework is convenient for use of the typical expression pattern.

One sequence can reference any number of other sequences. Further, a plurality of sequences can reference one sequence located somewhere in the system. However, it is prohibited that references constitute a loop. The loop means that references are made in a loop such as sequence A referencing sequence B, sequence B referencing sequence C, and sequence C referencing sequence A. It should be noted that, when designating a sequence by the link event, the link event identifies a reference target not by ID code but by package name and sequence name.

As described above, according to the second aspect of the invention, the inventive method of processing data by means of a processor comprises the steps of providing a plurality of sequences each being composed of events which are data determining time-sequential occurrence of multimedia matter, one of the sequences containing a link event which is a secondary reference to another sequence, operating the processor when a primary reference is made to said one of the sequences for extracting therefrom the link event, and for incorporating said another sequence referred to by the link event into said one sequence in place of the link event so as to form a composite sequence, and providing the composite sequence in response to the primary reference for presenting the time-sequential occurrence of the multimedia matter. Preferably, the step of providing provides said another sequence in the form of a curve sequence containing a series of events each being data determining a pair of a time and a value such that the curve sequence represents time-variation of the multimedia matter, and the processor is operated to incorporate the curve sequence into said one sequence so as to apply the time-variation to the time-sequential occurrence of the multimedia matter. Preferably, the step of providing provides said one sequence containing a first link event and a second link event, and provides a first curve sequence corresponding to the first link event and a second curve sequence corresponding to the second link event. In such a case, the processor is operated when first time-variation represented by the first curve sequence and second time-variation represented by the second curve sequence overlap with each other for consolidating the first curve sequence and the second curve sequence into a composite curve sequence, and for concurrently consolidating the first link event and the second link event into a single link event to conform with the composite curve sequence. Preferably, the step of providing provides said one sequence in the form of a music sequence composed of music events determining time-sequential occurrence of music notes as one form of the multimedia matter, and provides the curve sequence representing time-variation of the music notes. Preferably, the step of providing provides said one sequence in the form of one music sequence composed of music events determining time-sequential occurrence of music notes as one part of the multimedia matter, and provides said another sequence in the form of another music sequence composed of music events determining time-sequential occurrence of music notes as another part of the multimedia matter. In such a case, the processor is operated to incorporate said another music sequence into said one music sequence by means of the link event so as to present a whole of the multimedia matter.

Figure 15:
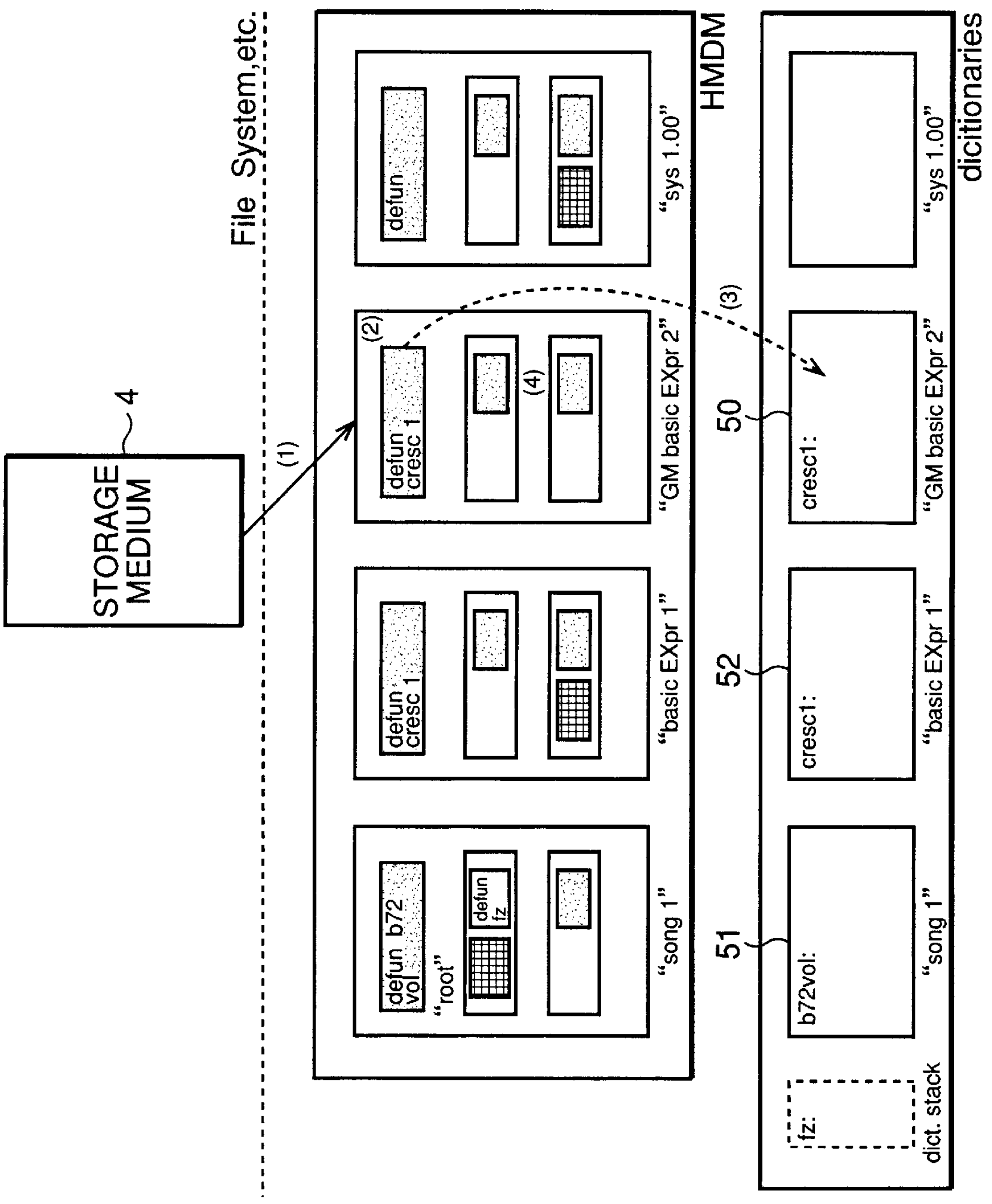
FIG. 15 is a diagram for explaining a behavior of HMF at package loading in the data processing apparatus associated with the present invention.

The following explains how the static data structure of HMF dynamically behaves in response to an external request for reference. As shown in FIG. 15, one package is loaded in the form of an HMF file stored in the storage medium 4 constituting a part of the file system, for example. When the package is loaded, the package-script is executed. If there is a subroutine definition, the same is stored in a package dictionary that is prepared separately.

The following explains a dictionary. The dictionary holds variables/subroutines that appear in the script. Two types of dictionary are available; a package dictionary provided for each package and a dictionary stack for holding data that exists only while the script is executed. For example, as shown in FIG. 15, when a package “GMbasicExpr2” of HMF format is loaded in step (1), the contents of the loaded the package “GMbasicExpr2” are held at a place designated by user. Next, in step (2), the package-script is executed. In step (3), subroutine definition “cresc1” in the package GMbasicExpr2” is stored in a dictionary 50 generated at a position corresponding to the package “GMbasicExpr2.” The sequence-script in the package is compiled into an executable form beforehand but is not yet executed.

In FIG. 15, a package “song1” of HMF format is also loaded. The package-script of this package is also executed. A subroutine definition “b72vol” of this script is stored in a dictionary 51 generated at a position corresponding to the package “song1.” Likewise, when a package “basicExpr1” is loaded, the package-script of this package is executed. A subroutine definition “cresc1” is stored in a dictionary 52 generated at a position corresponding to the package “basicExpr 1.” It should be noted that a dictionary stack “dict.stack” has not yet been generated.

Figure 16:
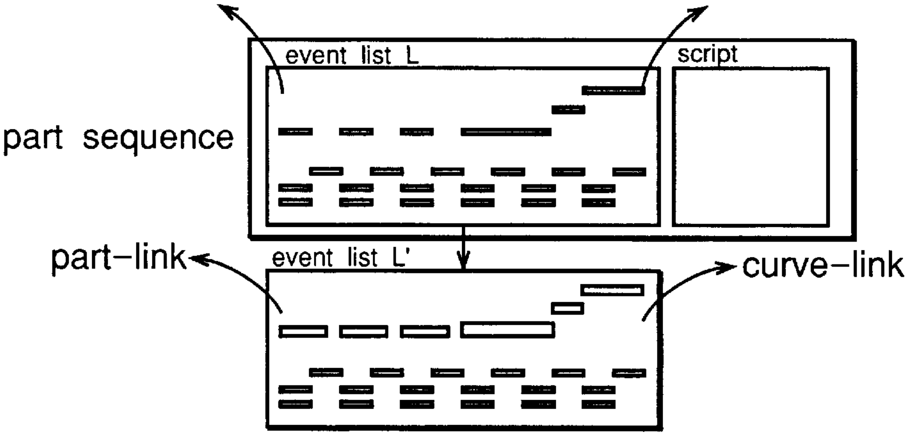
FIGS. 16(*a*) through 16(*d*) are a diagram for explaining sequence referencing processing in the data processing apparatus associated with the present invention.
Figure 16:
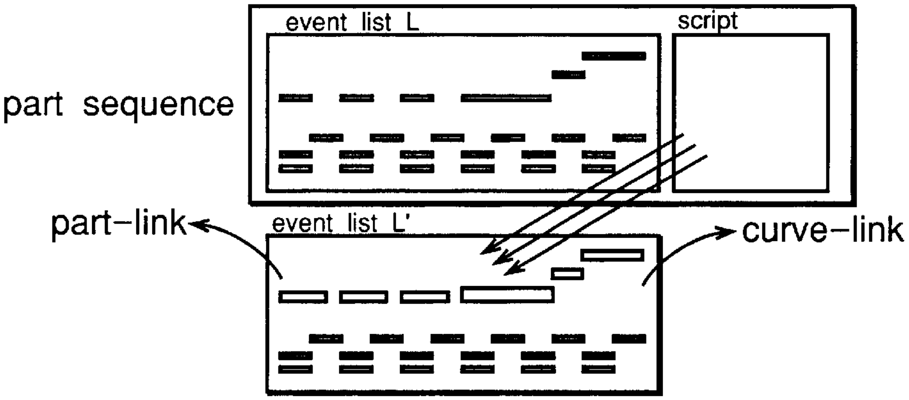
Figure 16:
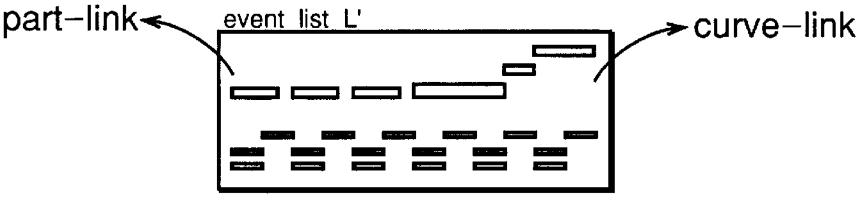
Figure 16:
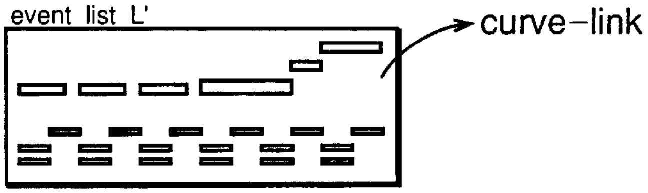
Figure 17:
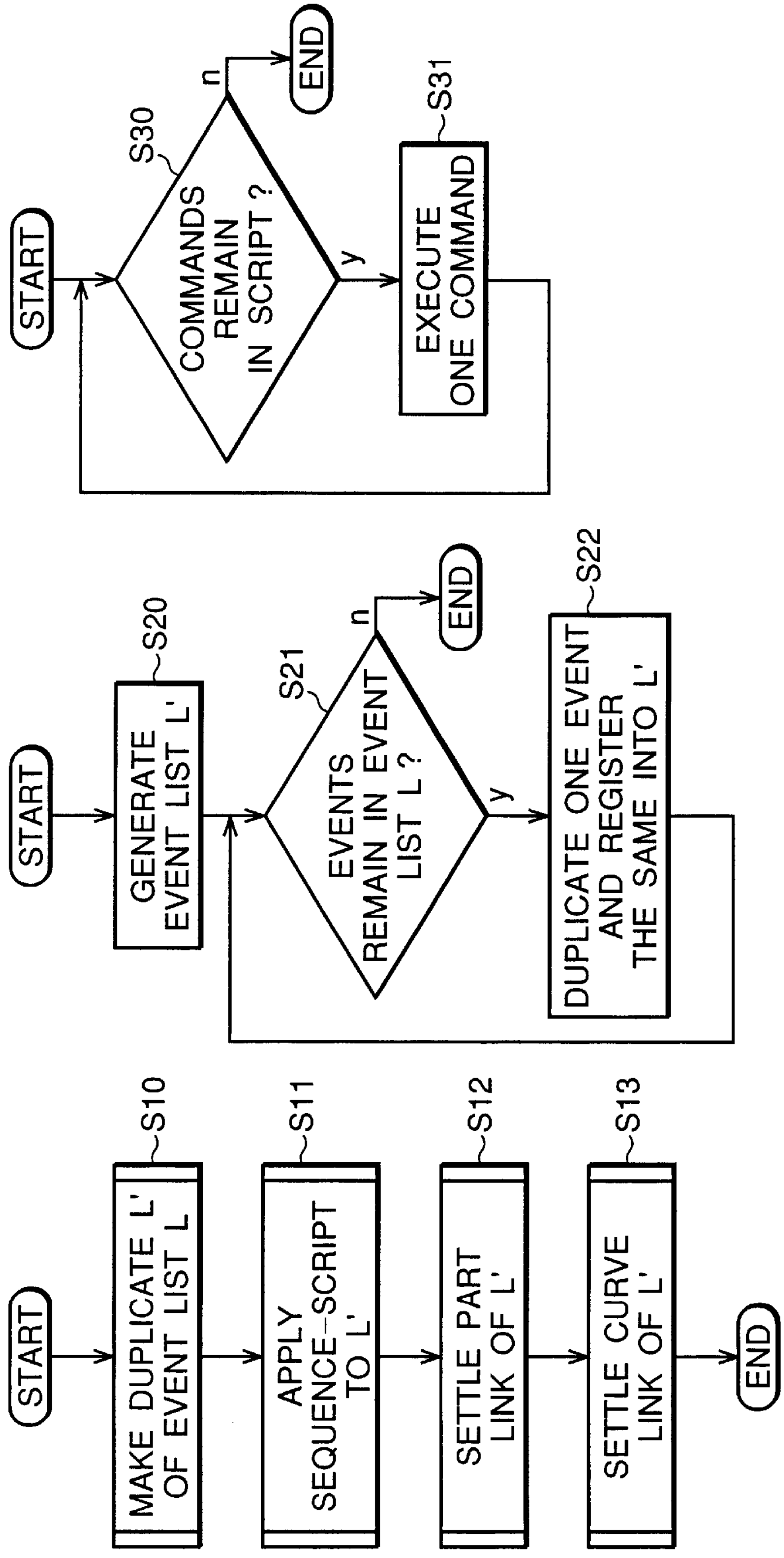
FIGS. 17(*a*) through 17(*c*) are a flowchart of the sequence referencing processing in the data processing apparatus associated with the present invention.

The following describes a behavior that takes place when the user references the contents of a sequence constituting music performance data after the data file of HMF format is loaded. Description is given for sequence reference processing to be performed when the user attempts to reference the contents of a sequence constituting music performance data in conjunction with FIGS. 16(*a*) through 18(*b*). FIGS. 16(*a*) through 16(*d*) schematically show the sequence reference processing. FIG. 17(*a*) through FIG. 18(*b*) show flowcharts of this processing.

Now, referring to the flowchart of the sequence reference processing shown in FIG. 17(*a*), when the sequence reference processing starts, a duplicate event list L' of an event list L is created in step S10 as shown in FIG. 16(*a*). Details of the processing of step S10 is shown in the flowchart of FIG. 17(*b*). When the event list L duplicating process starts, an empty duplicate event list L' is generated in step S20. Next, in step S21, it is determined whether the event list L has more events to be processed. If an event to be processed is found, the decision is YES (y) and the process goes to step S22, in which one event is duplicated from the remaining events, and the duplicated event is registered in the event list L'. The processing operations of steps 20 and 21 are cyclically performed until there is no more events to be processed in the event list L. If there is no event to be processed, the decision is NO (n), upon which the duplicating process of the event list L comes to an end.

When the processing of step S10 has been completed, the sequence-script is applied in step S11 to the duplicated event list L' as shown in FIG. 16 (*b*). Details of the processing of step S11 are shown in the flowchart of FIG. 17 (*c*). When the script application processing starts, it is determined in step S30 whether the script has more commands to be executed. Because commands remain immediately after this processing has started, the decision is YES (y) and the process goes to step S31. In the step S31, one command is executed and the process goes back to step S30. The operations of steps S30 and S31 are cyclically performed until there is no more commands to be executed. When all the commands in the script have been executed, the decision is NO (n) in step S30, upon which the sequence-script application processing comes to an end.

Figure 18:
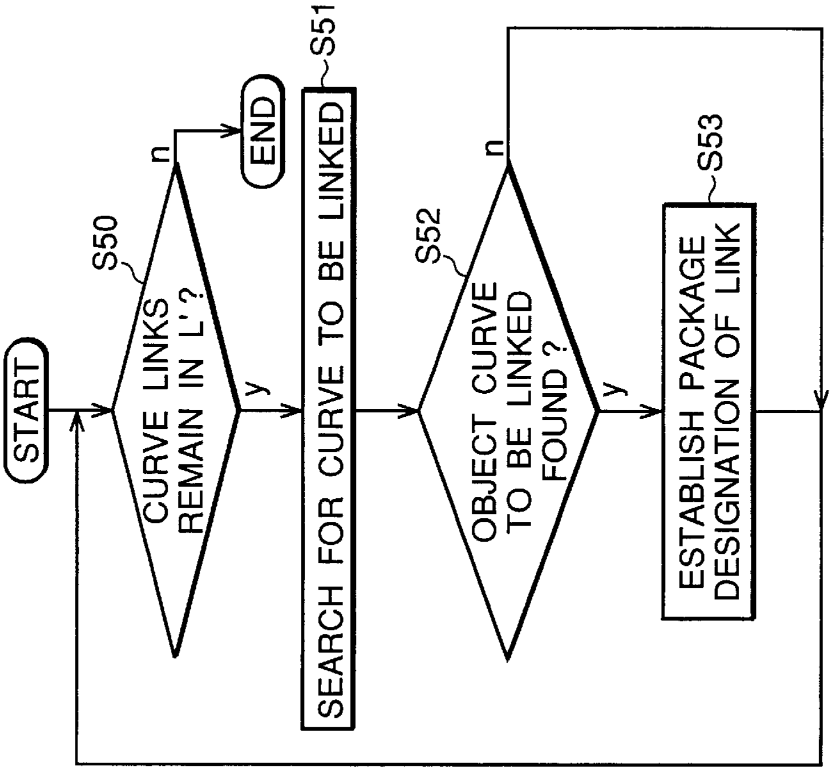
FIGS. 18(*a*) and 18(*b*) are another flowchart of the sequence referencing processing in the data processing apparatus associated with the present invention.
Figure 18:
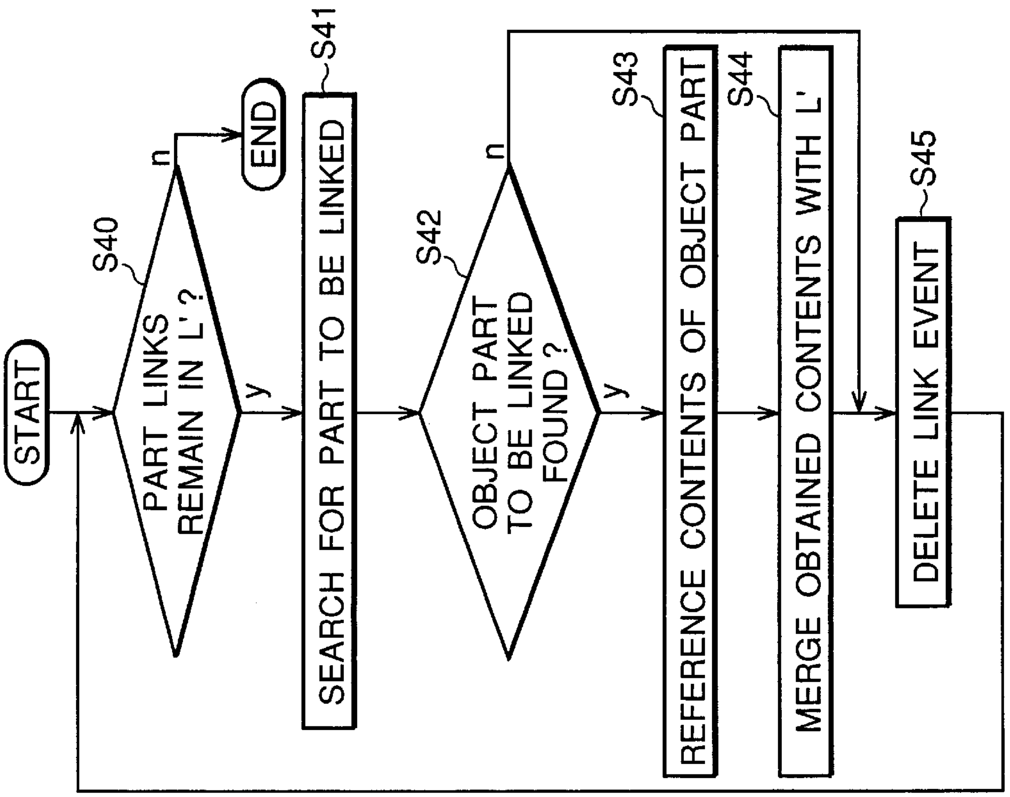

When the processing of step S11 has been completed, processing for settling a part link contained in the duplicate event list L' is performed in step S12 as shown in FIG. 16(*c*). The flowchart of this part link processing is shown in FIG. 18(*a*). When the part link processing starts, it is determined in step S40 whether the event list L' has more part links to be processed. If a part link is found remaining in the event list L', the decision is YES (y) and the process goes to step S41. In step S41, search is made in a predetermined order for the parts to be linked. If, in step S42, a part to be linked is found, the decision is YES (y) and the contents of the part are referenced in step S43. Next, in step S44, the contents of the event list obtained in step S43 are merged with the event list L'. Further, the link event processed in step S44 is deleted at step S45 and the process goes back to step S40. If there is no more parts to be linked in step S42, the decision is NO (n) and the process jumps to step S45, in which that link event is deleted. The operations of steps S40 through S45 are cyclically performed until there is no part link in the event list L'. When there is no more part link to be processed, the decision is NO (n) in step S40, upon which the part link processing comes to an end.

When the processing of step S12 has been completed, the processing for settling curve links contained in the duplicate event list L' is performed in step S13 as shown in FIG. 16(*d*). The flowchart of this curve link processing is shown in FIG. 18(*b*). When the curve link processing starts, it is determined in step S50 whether the event list L' has more curve links to be processed. If a curve link is found remaining in the event list L', the decision is YES (y) and the process goes to step S51. In step S51, search is made in a predetermined order for the curves to be linked. If a curve to be linked is found in step S52, the decision is YES (y) and, in step S53, the package destination of that link is established, upon which the process goes back to step S50. If no curve to be linked is found in step S52, the decision is NO (n) and the process goes back to step S50 without doing anything. The operations of steps S50 through S53 are cyclically performed until there is no more curve link to be resolved in the event list L'. When there is no curve link remaining in the event list L', the decision is NO (n) in step S50, upon which the curve link processing comes to an end. Thus, the sequence reference processing comes to an end.

Figure 28:
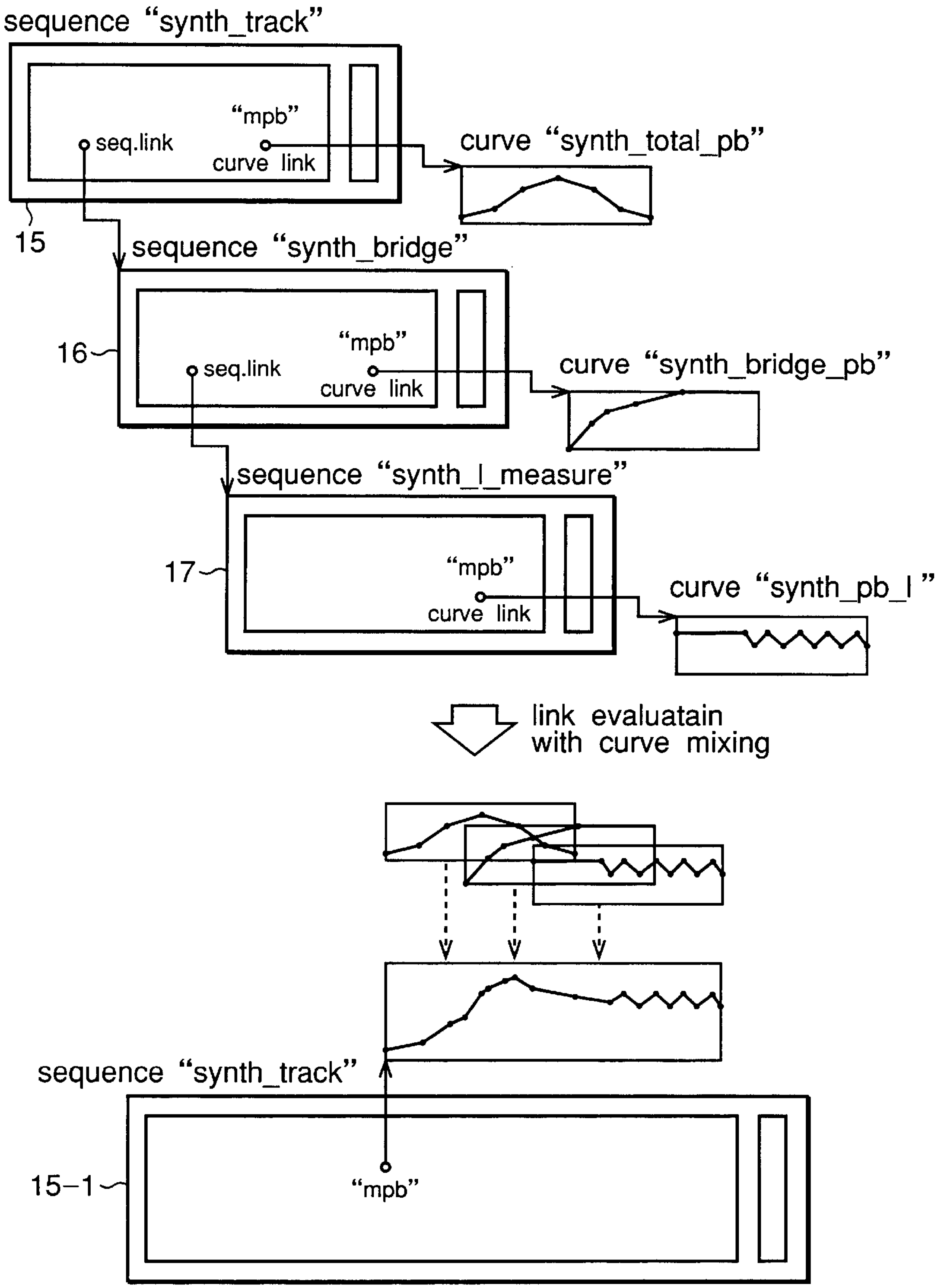
FIG. 28 is a diagram for explaining the settling of a part link and a curve link in the data processing apparatus associated with the present invention.

The following explains a manner in which a part link and a curve link are settled with reference to FIG. 28. In an example of FIG. 28, a part link is spanned from a part sequence "synth_track" to another part sequence "synth_bridge." Further, a part link is spanned from the part sequence "synth_bridge" to another part sequence "synth_1_measure." Moreover, a curve link is spanned from the part sequence "synth_track" to a curve sequence "synth_total_pb." A curve link is spanned from the part sequence "synth_bridge" to a curve sequence "synth_bridge_pb." A curve link is spanned from the part sequence "synth_1_measure" to a curve sequence "synth_pb_1."

In this state, when the contents of the part sequence "synth_track" are referenced, a part link event is found, so that a part sequence to be linked is searched according to the flowchart shown in FIG. 18(*a*). The contents of the part sequence "synth_bridge" found at the link destination are referenced. It should be noted that the search for the part sequence to be linked is performed by a search path. When the contents of the part sequence "synth_bridge" are referenced, a part link event is also found therein, so that a part sequence to be linked is searched. The contents of the part sequence "synth_1_measure" found at the link destination are referenced.

Since no link is spanned from the part sequence "synth_1_measure" to another part sequence, the contents of the part sequence "synth_1_measure" are merged with the part sequence "synth_bridge". The part link event existing in the part sequence "synth_bridge" is deleted. Since the curve link event exists in the part sequence "synth_1_measure", this curve link is also merged with the part sequence "synth_bridge." Consequently, the part sequence "synth_bridge" comes to have two curve link events. Then, the contents of the part sequence "synth_bridge" are merged with the part sequence "synth_track". The part link event existing in the part sequence "synth_track" is deleted. The two curve link events existing in the part sequence "synth_bridge" are also merged with the part sequence "synth_track". Consequently, the part sequence "synth_track" comes to have three curve link events. Because the part link event existing in the part sequence "synth_track" is deleted, the processing shown in the flowchart of FIG. 18(*a*) comes to an end. Then, according to the flowchart shown in FIG. 18(*b*), the three curve link events collected in the part sequence "synthtrack" are settled. The curve sequences to be linked are searched one by one, and each curve sequence is implemented.

After the curve sequence is established, the curve events are expanded into an actual event, for example, a pitch bend event. The curve event data is eventually captured in the part sequence "synth_track". At this moment, if two or three curve events are close to each other in location, there occurs a overlapped portion between the curve events. Composite processing is performed on the overlapped portion to form a composite curve sequence. As for the curve link events, only the curve link event corresponding to the first of the composited curve sequences is left, the other curve link events being deleted. If a plurality of curve link events exist in one part sequence from the beginning, and the curve sequences to be captured in the part sequence are overlapped with each other by these curve link events, the overlapped portion composited in the same manner as mentioned above.

Figure 19:
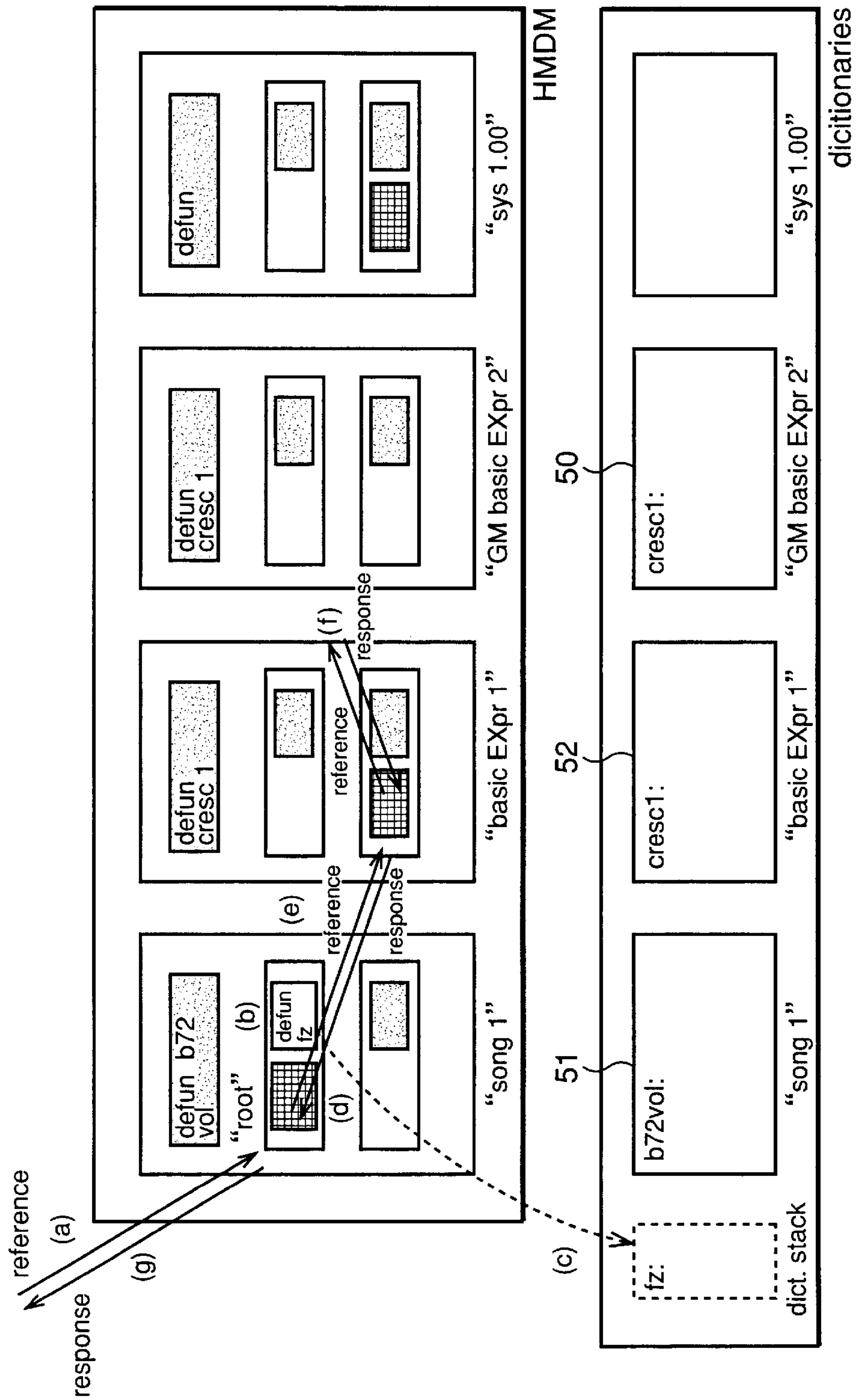
FIG. 19 is a diagram for explaining internal recursive reference behavior to contents of a sequence in the data processing apparatus associated with the present invention.

The following explains the above-mentioned sequence reference processing by using an example in which reference is made to the contents of it the sequence "root" of the performance package "song 1" shown in FIG. 19. First, before starting the sequence reference processing, reference to the a sequence "root" of the performance package "song 1" is requested in step (a). Next, in step (b), execution of the sequence-script of the sequence "root" starts. During execution, in step (c), a temporary subroutine definition "fz" contained in the sequence-script is placed in the created dictionary stack "dict. stack". Further, in step (d), when the sequence-script is executed, the contents of the event list of the sequence "root" are modified by the sequence-script.

When the execution of the sequence-script comes to an end, the sequence link events in the event list are settled in step (e). Namely, the contents of a linked sequence are referenced and the resultant event list is merged with the position at which the link event exists. Illustratively, the contents of a sequence in a package "basicexpr 1" are referenced. As shown, in step (f), reference to the contents of low-order sequences recursively progresses on a depth-preferred basis. In step (g), the final event list is obtained. When the above-mentioned series of reference operations has been executed, the temporary subroutine definition "fz" of the dictionary stack is deleted.

Figure 20:
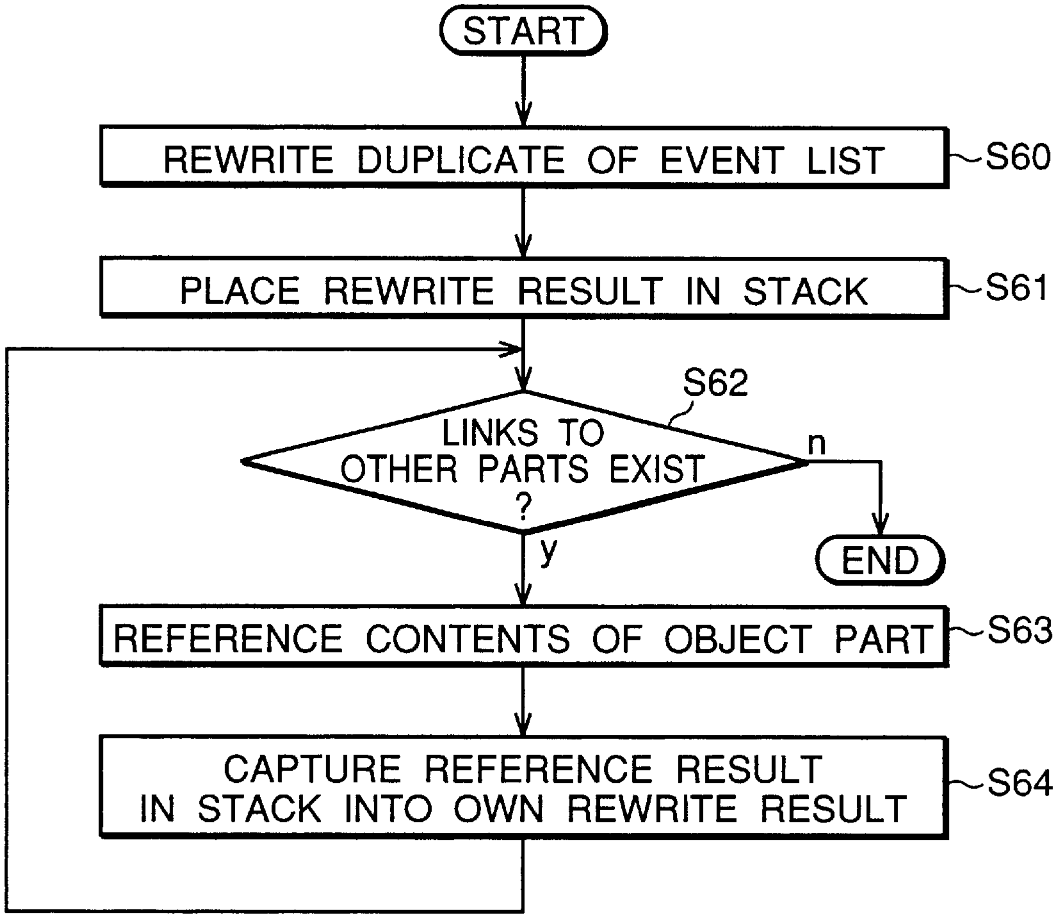
FIG. 20 is a flowchart indicating processing for recursively referencing the contents of sequences in the data processing apparatus associated with the present invention.

FIG. 20 shows a flowchart of the above-mentioned sequence contents reference processing that recursively progresses on a depth-preferred basis. Referring to this flowchart, when the sequence contents reference processing starts, a duplicate of the original event list is rewritten in step S60. Next, in step S61, the result of the rewrite operation is put in the stack. In step S62, it is determined whether there is a link to another part sequence. If the link is found, the decision is YES (y) and the process goes to step S63, in which the contents of the linked part sequence are referenced. Then, in step S64, the reference result held in a stack is captured into the above-mentioned rewrite result, and the process goes back to step S62. The operations of steps S62 through S64 are cyclically executed until there is no more link to another part sequence. When no link is found, the decision is NO (n), upon which the sequence contents reference processing comes to an end.

Figure 21:
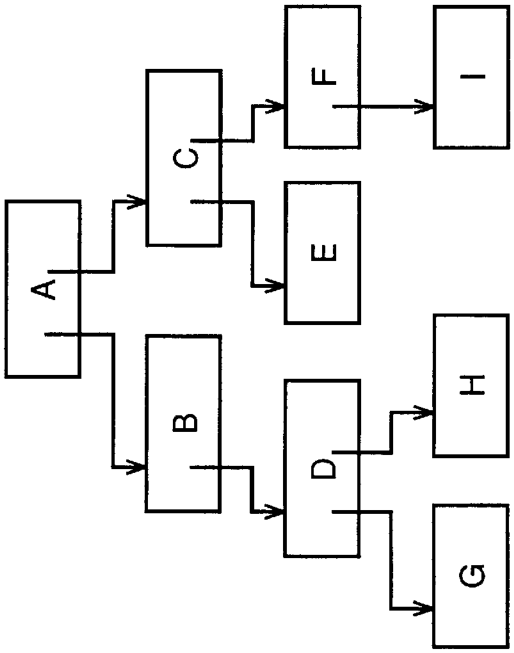
FIGS. 21(*a*) and 21(*b*) are a diagram for explaining the processing for recursively referencing the contents of the recursive sequence in the data processing apparatus associated with the present invention.
Figure 21:
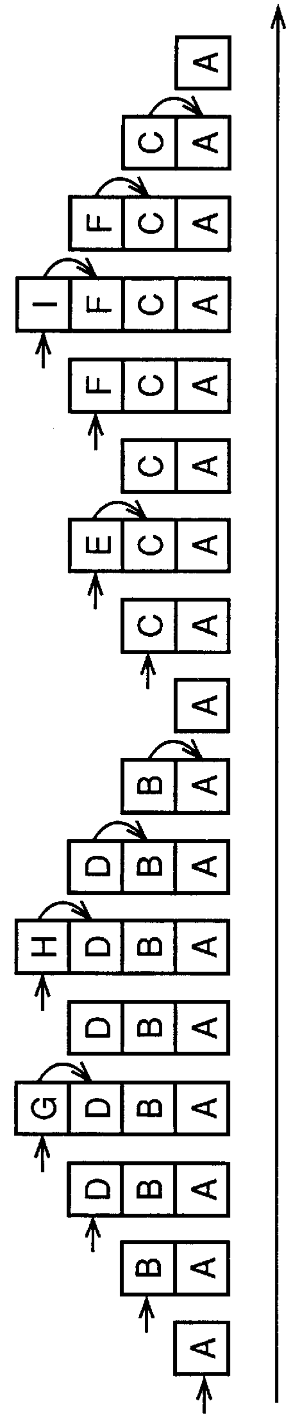

The following more specifically explains the above-mentioned sequence contents reference processing. As shown in FIG. 21(*a*), the sequence contents reference processing is performed on a sequence group having links to other part sequences. FIG. 21(*b*) shows how the stack changes with the progression of the link settling process. As shown in FIG. 21(*b*), sequence A has links to sequence B and sequence C. Sequence B has a link to sequence D. Sequence D has links to sequence G and sequence H. Further, sequence C has links to sequence E and sequence F. Sequence F has a link to sequence I.

In this example, when the sequence contents reference processing shown in FIG. 20 is performed, the contents of sequence A are referenced, and sequence B is stacked as the result of the sequence contents reference processing. Next, the contents of sequence B are referenced, and sequence D is stacked. Further, the contents of sequence D are referenced and sequence G is stacked. Since sequence G has no link, the sequence G returns the rewrite result to sequence D as indicated by down-arrow. Sequence D also has the link to sequence H, so that sequence H is stacked. Since sequence H has no link, sequence H returns the rewrite result to sequence D as indicated by down-arrow. Since sequence D has no more links, sequence D returns the rewrite result to sequence B. Sequence B returns the rewrite result to sequence A. This processing is repeated for sequences C, E, F, and I, while changing the state of the stack as shown in FIG. 21(*b*).

Meanwhile, within the script, a subroutine available at system level can be called explicitly for settling the sequence links. In this case, the sequence links in the event list are settled at the time this subroutine is called. Likewise, a subroutine for settling curve links can be called. When these subroutines are called and executed, the portion of the script after the execution allows inclusion of the contents of low-order sequences into the portion to be processed.

In addition, a description by which link events are rewritten or deleted can be written in the script . When this description is executed, the rewritten link events are processed in the subsequent link settlement. If no script is written by these specifications, an operation will result in that expression application in a high-order sequence does not extend to the events of a low-order sequence. Therefore, writing the script allows realization of an operation by which expression application in a high-order sequence is extended to the events of a low-order sequence.

The following explains a search path of packages and dictionaries. First, necessity of search will be explained. A sequence to be referenced by a link event may exist in a package other than the package in which this link event is arranged. Generally, the script includes subroutine calling commands. The substance of a subroutine is not always included in the package in which the script of the subroutine is placed. This is why searching of packages and subroutines is required. In the HMDM data structure, packages are conceptually arranged in a desired order. The subroutines defined by each package are stored in the dictionary prepared for each package as explained before. The strings of these packages and dictionaries arranged in the desired order are referred to as a search path. Search is performed on the packages and dictionaries along this search path.

In the HMDM data structure, the search path for indicating the order in which the packages and dictionaries are arranged is defined as follows. As for the dictionaries, a dictionary stack has the first priority and a dictionary corresponding to the performance package has the second priority. As for the packages, the performance package comes first. In this case, a plurality of performance packages and dictionaries thereof may exist. The order in which these performance packages and dictionaries are arranged can be changed by the user without restriction. When searching subroutines, the dictionaries are checked in the order specified by the search path. If subroutines having the same name have been found, the subroutine found first is preferred. This realizes overriding of subroutines. A dictionary corresponding to the system package has the fourth priority. The package having the third priority is the system package. The system package is placed in the search path at an end thereof, and hence the user cannot change the position of the system package.

In the example shown in FIG. 19, the search path is constituted by the dictionary stack "dict.stack", the performance package of "song 1" and the corresponding dictionary, the plug-in package of "basicExpr1" and the corresponding dictionary, the plug-in package of "GMbasicExpr2" and the corresponding dictionary, and the system package of "sys1.00" and the corresponding dictionary, in this order. At the time of link event settlement, the sequence names are searched in this order. At the time of execution of the script, the subroutine names are searched in this order.

The following explains the above-mentioned search path mechanism. In searching sequence names, if sequence names appear alone, the following procedure is applied and the sequence name first hit is selected.

1. The start package of the search path is searched for the sequence name.

2. In the order of the search path, the next package is searched for the sequence name.
3. If no sequence is found even in the last package (the system package), appropriate processing such as issuing message "no sequence found" is performed. If a sequence is designated together with the package name, the sequence name is searched for in the designated package. If the sequence name is not found in that package, appropriate processing such as issuing message "no sequence found" is performed.

In search of subroutine name, if subroutine names appear alone, search is made as follows.

1. The dictionary stack is searched for the subroutine name.
2. The dictionary corresponding to the start package is searched for the subroutine name.
3. In the order of the search path, the next dictionary is searched for the subroutine name.
4. If the subroutine name is not found until the last dictionary (the system dictionary), appropriate processing such as issuing message "no subroutine found" is performed. If a subroutine name is designated together with the package name, the designated package is searched for the subroutine name. If the subroutine name is not found in the package, appropriate processing such as issuing message "no subroutine found" is performed.

The following explains realization of overriding of subroutines according to the order of the packages. If a subroutine defined in a plug-in package is designated together with the package name, there occurs no confusion between this subroutine and a subroutine having the same name in another package. In this case, plug-in packages can be arranged in any order. On the other hand, a subroutine can be designated only by the subroutine name without explicitly indicating the package. In this case, the second package including the subroutine having the same name can be placed before the first package in the search path. By inserting this second package, the other subroutine having the same name but different contents can be executed. This realizes subroutine overriding. In this case, the order of the subroutines in the search path affects the operation.

As described above, according to the third aspect of the invention, the inventive method of processing data by means of a processor comprises the steps of loading a package which is a file containing at least one sequence and a plurality of scripts, the scripts including a package-script bound to the package and a sequence-script bound to the sequence, the sequence being composed of events which are data determining time-sequential occurrence of multimedia matter while the sequence-script is a program modifying the time-sequential occurrence of the multimedia matter, operating the processor when the package is loaded for executing the package-script to initialize the file, subsequently operating the processor when reference is made to the sequence for executing the sequence-script to rewrite the events, and providing the sequence containing the rewritten events in response to the reference for modifying the time-sequential occurrence of the multimedia matter. Preferably, the step of loading loads a plurality of the packages each of which contains the package-script having definition of a subroutine while one of the scripts belonging to the packages has a call command for a subroutine, and the step of operating comprises sorting the provided packages to define a search order, executing each package-script to prepare a dictionary of a subroutine according to the definition thereof, searching the dictionaries of the respective packages when said one script is executed according to the defined search order to call the subroutine specified by the call command. Preferably, the step of sorting can exchange, add and delete the packages to arrange the search order.

Further, the inventive method of processing data by means of a processor comprises the steps of providing a plurality of packages each of which can accommodate therein at least one sequence, the sequence being composed of events which are data determining time-sequential occurrence of multimedia matter, one sequence belonging to one package containing a link event which is a secondary reference to another sequence belonging to another package, sorting the provided packages to define a search order, operating the processor when a primary reference is made to said one sequence for extracting therefrom the link event, then searching the packages according to the defined search order to find said another sequence referred to by the link event, incorporating said another sequence into said one sequence in place of the link event so as to form a composite sequence, and providing the composite sequence in response to the primary reference for presenting the time-sequential occurrence of the multimedia matter. Preferably, the sorting step can exchange, add and delete the packages to arrange the search order.

The following explains consolidation of curve data with reference to FIGS. 22(*a*) through 26(*b*). The consolidation of curve data denotes that, in the process of settling a sequence link, the curve data in a low-order sequence is composited and collected into one with the curve data in a high-order sequence. For example, sometimes, in each of a plurality of hierarchical sequences, time variation of parameters of the same type called MIDI pitch bend is set. In this case, if a curve is expanded into many MIDI pitch bend events in each sequence and the resultant events are captured, discrete events are mixed together, so that individual variations are not correctly added together as explained before with reference to FIG. 10(*a*). A curve algorithm to be described below is for processing this consolidation correctly.

First, the structure of curve data will be explained in detail with reference to FIGS. 22(*a*) through 22(*d*). FIG. 22(*a*) shows the event list of curve A. FIG. 22(*c*) shows the event list of curve B. The curve data is represented in combination of a time and a corresponding value. These combinations provide nodes, adjacent nodes being connected by a straight line. Namely, curve A is represented in a desired order of nodes as shown in FIG. 22 (*b*), while curve B is represented in a desired order of nodes as shown in FIG. 22(*d*). The nodes are ordered according to time sequence. The curves are not followed retrospectively.

Further, a plurality of points may exist at the same time. In this case, as shown in FIG. 22(*b*), a discontinuous point appears in the line. In this case, the order of the points is still preserved. Of the points at the same time, the first point as shown in FIG. 22(*b*) is referred to as the left-side value, while the last point is referred to as the right-side value. If there are three or more points concurrent at the same time, the values of the points between the first and last points are ignored. At a given time along the curve, the corresponding value is determined uniquely in many cases. For a time at which one node exists, the corresponding value is identical to the value of that node. For a time between two nodes, the corresponding value is obtained by the interpolation between the two nodes. For a time at which a plurality of nodes exist, the left-side value and the right-side value that differ from each other exist.

Figure 23:
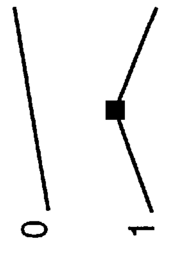
FIGS. 23(*a*) through 23(*h*) are another diagram for explaining consolidation of curve data in the data processing apparatus associated with the present invention.
Figure 23:
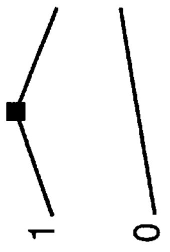
Figure 23:
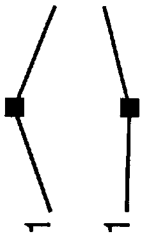
Figure 23:
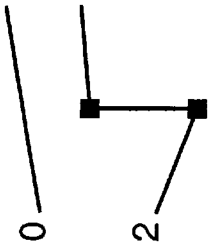
Figure 23:
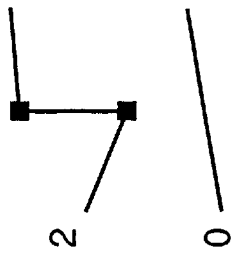
Figure 23:
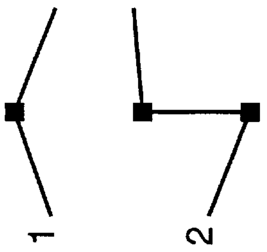
Figure 23:
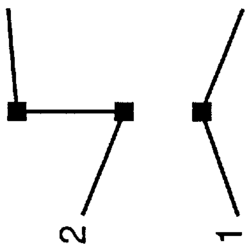
Figure 23:
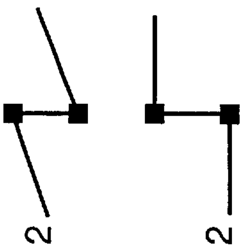

When consolidating these of curve data A and B together, the relationship between nodes is classified into eight types as shown in FIGS. 23 (*a*) through 23(*h*). In the cases of FIG. 23(*a*) and FIG. 23(*b*), only one of the two curves has a node at a time concerned. In the case of FIG. 23(*c*), two curves have respective nodes at a time concerned. In the case of FIG. 23(*d*) and FIG. 23(*e*), only one of two curves has a discontinuous point at a time concerned. In the case of FIG. 23(*i*) and FIG. 23(*g*), one of the curves has a discontinuous point at a time concerned while the other curve has a node. In the case of FIG. 23(*h*), both curves have a discontinuous point at a time concerned. It should be noted that the numeral to the left of each curve denotes the number of nodes at a time concerned.

The following explains a curve consolidation algorithm with reference to FIGS. 24(*a*) through 26(*b*)by using an example in which the above-mentioned curve A and curve B are added together. The curve consolidation algorithm is capable of correctly performing consolidation regardless of any node relationship shown in FIGS. 23(*a*) through 23(*h*).

First, if the value of each end node is not 0 for each of curve A and curve B, the node of value 0 is added as shown in FIGS. 24(*a*) and 24(*c*). This is because, for a time at which no value is specified, the curve value is assumed 0.

Next, the original of curve A is duplicated and the duplicated curve is denoted curve A0 shown in FIG. 25(*a*). Then, for each node of curve A, a value of curve B at each time is obtained (for a discontinuous point, the left-side value is used). The obtained value is added to the value of the node of curve A. If, however, curve A has a plurality of nodes at a time and curve B also has a plurality of nodes at the same time, the nodes other than the first node are deleted from curve A and the consolidation is performed only for the first node. These add operations are shown in the event list of curve A in FIG. 24(*b*) and the resultant addition amounts are indicated by dashed line in FIG. 24(*a*).

In the event list of curve A, value 64 to be added to the original value 70 at time 70 for example is obtained by performing linear interpolation between the right-side value 60 at time 60 and value 80 at time 110 of curve B. Likewise, the value 60 added at time 140 and the value 120 added at time 240 are also obtained by linear interpolation. Since the value at time 190 of curve B is a discontinuous point, the left-side value 100 is added to the node at time 190 of curve A.

Then, for each node of curve B, the value at each time of curve A0 is obtained (the right-side value is selected for a discontinuous point). The obtained value is added to the value of the node of curve B. If, however, curve B has a plurality of nodes at a time and curve A0 also has a plurality of nodes at the same time, the nodes other than the last node of curve B are deleted and consolidation is performed only for the last node. These add operations are shown in the event list of curve B in FIG. 25(*d*), and the resultant addition amounts are indicated by dashed lines. In the event list of curve B, value 73 to be added to the original value at time 60 for example is obtained by performing linear interpolation between the right-side value 40 at time 10 and value 80 at time 70 of curve A. Likewise, value 47 added at time 130, value 108 added at time 170, and value 80 added at time 220 are obtained by linear interpolation. Since curve B is discontinuous at time 190 and curve AO has a node at the same time, the left-side value of curve B is deleted and value 140 of the node of curve A is added to the right-side value 140.

Figure 26:
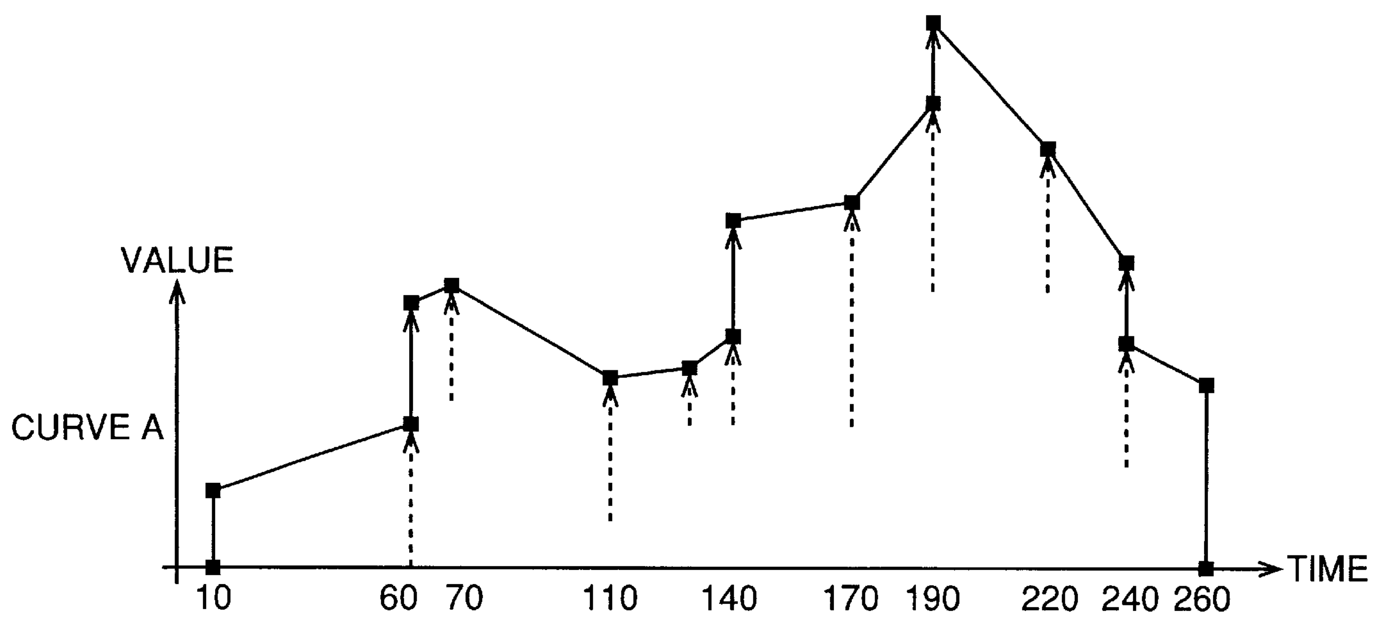
FIGS. 26(*a*) and 26(*b*) are a further diagram for explaining consolidation of curve data in the data processing apparatus associated with the present invention.

Next, the nodes of curve B that have been processed above are time-sequentially added to curve A shown in FIG. 24(*a*). In doing so, if curve A has no node at the same time, it is simply added. If curve A has a node at the same time, the node of curve B is inserted behind the node of curve A as the right-side value only when the already existing node of curve A has a value different a from that of the curve B node. This provides a new curve of FIG. 26(*a*) as a consequence of adding curve A and curve B together. The event list of the new curve is shown in FIG. 26(*b*).

For example, at time 110, the corrected curve A and the corrected curve B both have nodes. Since these nodes have the same value, the value of curve B is not inserted. Also, at time 190, both the corrected curve A and the corrected curved B have nodes, but the values of these nodes are different, so that the node of curve A is assumed the left-side value and the node of curve B is assumed the right-side value. The curve consolidation algorithm as mentioned above is executed at curve link settlement, thereby correctly adding pieces of curve data together to generate new curve data.

The following explains the processing of HMF data by use of a conventional SMF reproducing apparatus, a conventional SMF editing apparatus, and a novel HMF-compatible processing apparatus, by way of example.

Figure 27:
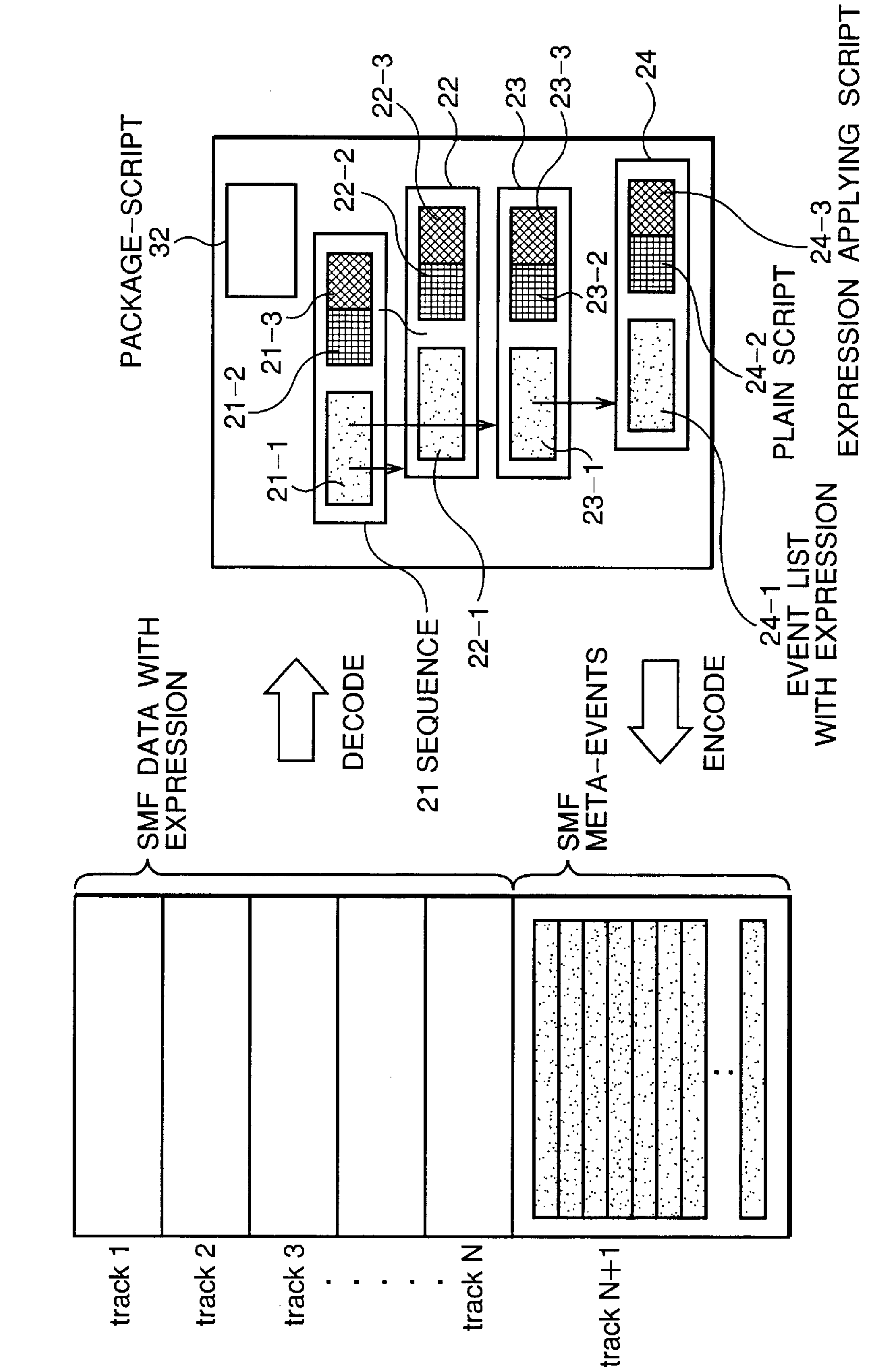
FIGS. 27(*a*) and 27(*b*) are a diagram for explaining compatibility between data of the HMF format and data of the SMF format.

Embedding a package of HMF format in a conventional SMF file realizes data compatibility between SMF and HMF. HMF can support SMF format 0 or SMF format 1. In SMF format 0, SMF meta-events obtained by describing HMF data in text form are distributed in one SMF track. By use of these meta-events, the HMF description is stored. In SMF format 1, SMF data having normal expression is stored in the first N tracks as shown in FIG. 27(*a*), and only the SMF meta-events obtained by describing HMF data in text form are placed in N+1 track, thereby storing the HMF description.

Decoding these SMF meta-events provides a package having a data structure based on HMDM. This package stores a package-script 32 and a plurality of sequences 21 through 24 as shown in FIG. 27(*b*), for example. These sequences store event lists with expression 21-1 through 24-1, scripts for removing expression 21-2 through 24-2, and scripts for applying expression 21-3 through 24-3. When the scripts for removing expression 21-2 through 24-2 are executed, the expression effects attached to event lists 21-1 through 24-1 are removed to make them plain. When the scripts for applying expression 21-3 through 34-2 are executed, the plain event lists 21-1 through 24-1 are applied with desired expression effects.

The above-mentioned novel setup allows use of widely distributed MIDI data having expression as it is for HMF data. For music data to be newly composed, only the plain event lists may be used instead of the event lists having expression 21-1 through 24-1 and the script for removing expression 21-2 through 24-2.

Loading of the data incorporating the above-mentioned HMF data into the above-mentioned processing apparatuses is performed as follows. When HMF data is read by a conventional SMF player incompatible with HMF, all SMF meta-events of the HMF data described in text form are ignored, so that the stored SMF data with expression is reproduced as it is. Since the SMF player cannot read an HMF description, no different expansion can be generated by giving parameters. However, if an example of the result of HMF expansion is stored in the SMF portion beforehand when creating HMF data, that expansion can be reproduced.

When the data incorporating HMF data is loaded in a processing apparatus compatible with HMF, it is first checked if the SMF data includes an SMF meta-event obtained by describing HMF data in text form. The SMF meta-event includes identification information. Based on this identification information, it is checked if there is an SMF meta-event obtained by describing HMF data in text form. If any of such an SMF meta-event is found, it is determined that the data is of HMF format. If no SMF meta-event is found, it is determined that the data is of HMF format.

If the loaded data is found of SMF format, the data is loaded in the conventional manner. Namely, SMF data is stored in one track for format 0 or in N tracks for format 1. If the loaded data is found of HMF format, ordinary SMF data is all ignored and only the included SMF meta-events are collected to be decoded. Consequently, the HMF data described in text form can be read.

In an SMF editing apparatus incompatible with HMF, the contents of an SMF meta-event can be edited on an event list screen of a monitor. In principle, HMF data can be created in this apparatus. However, the editing operation by this apparatus becomes complicated and the created data cannot be reflected onto the SMF portion. The SMF editing apparatus can edit SMF meta-events and can save the edited results but the contents of the description cannot be reflected onto the SMF portion. To make the reflection, the edited meta-event must be read into the HMF-compatible processing apparatus before being saved or a special tool must be used.

To make the saving in the HMF-compatible processing apparatus, the contents of the entire edited and created HMF must be evaluated and the evaluation result must be stored on a track in SMF format in order to provide compatibility with SMF. In the case of a performance package, the "root" sequence is evaluated, how one entire piece of music is performed is computed, and the result is stored as SMF. In the case of a plug-in package, there is no "root" sequence, so that empty data is stored for SMF. Next, the contents of one HMDM package are converted to HMF description format, the resultant HMF data being divided into a plurality of SMF meta-events for storage. This division is made because the length of a meta-event is limited to a maximum of 256 bytes in SMF. Namely, the division is made such that the length of a meta-event does not exceed 256 bytes. When the SMF meta-events are stored, an ordinary SMF "time interval between events plus meta-event" is used. Since "time interval between events" is nominal and has no significance, any nominal value can be given as this time interval. In this case, only data of ordinary SMF format may be saved optionally. It should be noted that embedding of HMF data described in text form in an SMF meta-event is only an example; the HMF data described in text form may also be saved independently.

As described above, according to the fourth aspect of the invention, the inventive method of processing data by means of a processor comprises the steps of providing mixture of a first sequence having a simple format and a second sequence having a complex format, the first sequence being composed of events alone, the second sequence being composed of events and a script, the events being data determining time-sequential occurrence of multimedia matter while the script being a program modifying the time-sequential occurrence of the multimedia matter, operating the processor when reference is made to the first sequence for simply processing the same, operating the processor when alternative reference is made to the second sequence for executing the script to rewrite the events, and providing the second sequence containing the rewritten events in response to the alternative reference for modifying the time-sequential occurrence of the multimedia matter. Preferably, the step of providing provides the mixture of the first sequence and the second sequence in a serial track such that the first sequence and the second sequence are interleaved with one another. Preferably, the step of providing provides the mixture of the first sequence and the second sequence in parallel tracks such that the first sequence is allotted to one of the parallel tracks while the second sequence is allotted to another of the parallel tracks. Preferably, the step of providing provides the first sequence and the second sequence, each being composed of music events determining time-sequential occurrence of music notes as a specific form of the multimedia matter.

The following explains operations performed when a script is modified. A script can be rewritten by the user. When the user has rewritten a script, the system registers a new script source. If required, the system compiles the new script. Then, when a package-script has been rewritten, the system immediately executes the new package-script. Generally, the package-script has subroutine definitions. When the script is executed, subroutines are redefined. The new definitions are stored in a corresponding dictionary.

The sequence-script is compiled and its executable form is stored, upon which the execution of the script comes to an end. The executable form is not executed immediately. It is executed only when the contents of the sequence are referenced next. It should be noted that, if compilation results is in error, the executable form is not updated but the source text is stored. This storage is made to enable saving the source text even when it is still in the process of writing.

Meanwhile, when HMF attempts for referencing the contents of a sequence, HMF recursively references the contents of the sequence of link destination as explained before and outputs the final result. This, however, requires a large amount of computations, which inevitably takes time. The following explains an efficient sequence update control technique in which unnecessary sequence reference is made as less frequently as possible. First, as a mechanism, each sequence holds the result of the last reference as history. Also, each sequence has a flag that indicates whether the sequence has changed itself or not. The following shows a procedure of sequence update control.

1. When a sequence is inquired for its contents, the inquired sequence checks if there is any cause that changes itself after the last evaluation.
2. First, this inquired sequence requests all sub sequences to which link is spanned from this sequence for the most recent status. If all sub sequences make a reply that none of them have changed, this sequence does not need to settle the linking or to execute the script. In this case, this sequence may only reply that it has not changed and return the last status.
3. If any of the sub sequences replies that it has changed or if this sequence recognizes it own change, this sequence settles the linking and executes the script. In this case, this sequence replies that it has changed and returns the processing result, which is stored as the last status.
4. If the event list or the script of this sequence has been changed, this sequence sets a flag indicating that this sequence has changed.

The above-mentioned procedure reduces the number of unnecessary computations.

Unique to HMF is that execution of the script and link settlement have nothing to do with the progression of music performance. Execution of the script and link settlement are made in the process of symbolically building up time-sequential MIDI data in a data model. Namely, when an attempt is made to reference the contents of a sequence in HMF data, the reference is performed instantly for providing a resultant MIDI data series. A processing apparatus or application software compatible with HMF data has two units of an HMDM data processing section and a sequencer section. This sequencer section is adapted to have two pieces of MIDI data, old and new. Further, the sequencer section is adapted to shift to one piece of data without conflict while performing the other piece of data. Based on this capability, the HMF processing apparatus or the HMF application software operates as follows.

1. When music performance data is changed during the course of music performance, the HMDM data processing section instantly starts generating new MIDI data.
2. During that time, the sequencer section continues the performance with the MIDI data before the data changes.
3. When the new HMDM data has been generated, the same is passed to the sequencer section.
4. The sequencer section switches from the old MIDI data to the new MIDI data without a hitch. For example, the sequencer section makes switching at cross-fading or at a bar of a music score. After switching, the sequencer section continues performing the new MIDI data.

Thus, when data change is made during the music performance, the performance itself is gradually changed into another.

Modification of the HMDM requires a fairly large amount of update computations, possibly increasing the computation time enormously. To circumvent this problem, the application may update the HMDM and replace the MIDI data in the sequencer section in the background when the computation load is low. Further, if only the ending portion of music performance data is modified for example, the MIDI data before that portion need not be replaced for the time being, so that this MIDI data is not immediately replaced when the computation load is high. If the modification of the HMDM extends only to the limited MIDI data, the preceding MIDI data is partially modified, rather than reproducing the entire MIDI data, thereby reducing the computational amount.

The present invention includes the above-mentioned processing apparatus for processing HMF data and further covers the machine readable storage media for storing HMF data. This processing apparatus may be implemented by software. The storage media may be adapted to store only plug-in packages. The inventive machine readable media contains instructions for causing a processor to perform data processing which comprises the steps of receiving a sequence composed of events and a script, the events being data determining time-sequential occurrence of multimedia matter, while the script being a program modifying the time-sequential occurrence of multimedia matter, operating the processor when reference is made to the received sequence for executing the script to rewrite the events, and providing the sequence containing the rewritten events in response to the reference for modifying the time-sequential occurrence of the multimedia matter.

In the present invention, an event called "link" is arranged as explained above. This link event holds sequence names. The link event may hold package names in addition to the sequence names.

In the HMDM associated with the present invention, a plurality of packages are arranged in a desired order to determine a search path. When a package is loaded, its package-script is executed. At this moment, a dictionary of the loaded package is generated. When sequences are referenced, a temporary dictionary is generated. When subroutines are read at execution of the script, these dictionaries are searched along the search path. The subroutine having the name found first is selected. This novel setup allows flexible use of a script among packages. For example, plugging of a package allows overriding in which an existing subroutine may be replaced by another subroutine having the same name. In this case, a sequence is also searched by the sequence name in the order by which the packages are arranged.

In the present invention, an HMF package is distributed as meta-events described in text form along a track for storing SMF data. Alternatively, the meta-events are stored in a track other than tracks provided for storing SMF data. In this case, a meta-event or an exclusive SMF data is limited to a maximum length of 256 bytes, so that a longer text of HMF description is appropriately divided for storage.

In the explanation so far, a time-sequential event data series has been explained as music performance data. It will be apparent that the present invention is also applicable to time-sequential event data of various multimedia matters including audio and video. In the case of audio data, the tone quality, volume, and so on can be varied and changed arbitrarily like music performance data. In the case of video data, the sharpness and hue can be varied and changed arbitrarily.

According to the first aspect of the invention, a time-sequential event can be rewritten by executing a script to generate various pieces of time-sequential event data, thereby providing the active time-sequential event with variaty. Further, since each time-sequential event data can be identified at execution of the script, each of time-sequential event data can be manipulated selectively and individually, thereby enhancing ease of operation. Still further, since sequences can be grouped by a package, typical templates can be held without restriction, thereby enhancing ease of operation. Yet further, while time-variable data is conventionally represented in a discrete MIDI event series, the present invention represents the time-variable data in the form of desired curve data, thereby enabling to abstract various time-variable profiles such as volume and tempo. In addition, this curve data can be transferred as it is. Moreover, the present invention can prepare a script for indicating a procedure for optimizing data for different models of sound sources, thereby generating an optimum tone through any of the sound source models.

According to the second aspect of the invention, a time-sequential event is rewritten by executing a script, and a link event placed in the time-sequential event data series is settled. Hence, if a typical representation pattern is used repeatedly, only one typical representation pattern is provided, and reference by the link event thereto is used, thereby capturing the provided pattern every time the same is required. Further, while continuous time-variable data is conventionally represented as a discrete MIDI event series, the present invention represents the time-variable data in the form of curve data composed of a series of time-sequential events each denoted by a pair of time and value. The line curve data is referenced by a link event, thereby facilitating composition with other curve data. This allows the time-variable continuous data to indicate an attenuation profile to be freely applied to both of volume and tempo, for example. Further, this novel setup allows generation of time-variable continuous data of a new profile. Still further, the novel setup makes the stored curve data independent and readily available by linking the curve data, thereby facilitating reuse and sharing of the curve data.

According to the third aspect of the invention, a package that can store a plurality of sequences is prepared. Since the descriptive form of this package is specified as the new format, the package can be handled as a file. Consequently the structure of sequences stored in one package can be passed to another processing apparatus. Further, a package-script can be placed in the package separately from sequences contained in the same package. The package in which the package-script is placed alone can be used as a plug-in module. Namely, by this package-script, not only event data but also functional definitions can be introduced. Still further, a new data model is defined such that packages in which sequences are stored are held in a desired order by which the packages are searched for link event settlement, thereby allowing changing of the package line-up order and link destinations by package deletion or insertion. This results in flexible sharing of data and scripts.

According to the fourth aspect of the invention, an HMF package is distributed as meta-events described in text form in a track storing SMF data, or allocated in a track other than tracks storing SMF data. Thus, if conventional SMF data and a novel HMF package are stored in a set, the HMF package handled as a meta-event is ignored by the conventional reproducing machine, so that only the stored SMF data is reproduced. In the reproducing machine capable of reproducing HMF data, only HMF data assumed as a meta-event can be extracted for reproduction. This allows HMF data to have compatibility with SMF data.

While the preferred embodiments of the present invention have been described using specific terms, such description is for illustrative purposes only, and it is to be understood that changes and variations may be made without departing from the spirit or scope of the appended claims.

What is claimed is:

1. A data processing apparatus comprising:

an input that provides a sequence composed of events and a script, in the form of a package the events being data determining time-sequential occurrence of multimedia matter, while the script being a program modifying the time-sequential occurrence of multimedia matter;

a processor operative when reference is made to the provided sequence for executing the script to rewrite the events; and an output that provides the sequence containing the rewritten events in response to the reference for modifying the time-sequential occurrence of the multimedia matter.

2. A data processing apparatus according to claim 1, wherein the input affixes an identification code to an event for discriminating from each other, and wherein the processor discriminatively processes the events according to the identification code during the course of execution of the script.

3. A data processing apparatus according to claim 1, wherein the input provides a curve sequence containing a discrete series of events each being data determining a pair of a time and a value such that the curve sequence represents a time-variation of the multimedia matter, and wherein the processor rewrites the value of each event so as to modify the time-variation of the multimedia matter.

4. A data processing apparatus according to claim 3, wherein the processor interpolates the value between successive events during execution of the script so as to convert the discrete series of the events into a continuous series of the events.

5. A data processing apparatus according to claim 1, wherein the input provides a music sequence composed of music events determining time-sequential occurrence of music notes as one form of the multimedia matter.

6. A data processing apparatus according to claim 1, wherein the processor comprises a separator for separating the events and the script from each other which are initially bound to each other to compose the sequence, an interpreter for interpreting the separated script to produce an executable program, and a rewriter for executing the program to rewrite the separated events.

7. A data processing apparatus comprising:

an input that provides a sequence composed of events which are data determining time-sequential occurrence of multimedia matter;

a section that affixes at least one identification code to at least one event for discriminating the one event from other events; and a processor that selectively processes the one event according to the identification code.

8. A data processing apparatus comprising:

an input that provides a curve sequence containing a discrete series of events each being data determining a pair of a time and a value such that the curve sequence represents a time-variation of multimedia matter;

a section that provides a script which is a program modifying the time-variation of the multimedia matter;

a processor that executes the script to rewrite the value of each event so as to modify the time-variation of the multimedia matter; and a section that interpolates values between successive events during execution of the script so as to convert the discrete series of the events into a continuous series of the events.

9. A method of processing data by means of a processor comprising the steps of:

providing a sequence composed of events and a script in the form of package, the events being data determining time-sequential occurrence of multimedia matter, while the script being a program modifying the time-sequential occurrence of multimedia matter;

operating the processor when reference is made to the provided sequence for executing the script to rewrite the events; and providing the sequence containing the rewritten events in response to the reference for modifying the time-sequential occurrence of the multimedia matter.

10. A method according to claim 9, wherein the step of providing affixes an identification code to an event for discriminating from each other so that the processor can discriminatively process the events according to the identification code during the course of execution of the script.

11. A method according to claim 9, wherein the step of providing provides a curve sequence containing a discrete series of events each being data determining a pair of a time and a value such that the curve sequence represents a time-variation of the multimedia matter, and wherein the processor is operated to rewrite the value of each event so as to modify the time-variation of the multimedia matter.

12. A method according to claim 11, wherein the processor is operated to interpolate the value between successive events during execution of the script so as to convert the discrete series of the events into a continuous series of the events.

13. A method according to claim 9, wherein the step of providing provides a music sequence composed of music events determining time-sequential occurrence of music notes as one form of the multimedia matter.

14. A machine readable media containing instructions for causing a processor to perform data processing comprising the steps of:

receiving a sequence composed of events and a script in the form of a package, the events being data determining time-sequential occurrence of multimedia matter, while the script being a program modifying the time-sequential occurrence of multimedia matter;

operating the processor when reference is made to the received sequence for executing the script to rewrite the events; and providing the sequence containing the rewritten events in response to the reference for modifying the time-sequential occurrence of the multimedia matter.

15. A machine readable media according to claim 14, wherein the processor receives a curve sequence containing a discrete series of events each being data determining a pair of a time and a value such that the curve sequence represents a time-variation of the multimedia matter, and wherein the processor is operated to rewrite the value of each event so as to modify the time-variation of the multimedia matter.

16. An apparatus for processing data by means of a processor comprising:

means for providing a sequence composed of events and a script in the form of a package, the events being data determining time-sequential occurrence of multimedia information, while the script being a program modifying the time-sequential occurrence of multimedia information;

means for operating the processor when reference is made to the provided sequence for executing the script to rewrite the events; and means for providing the sequence containing the rewritten events in response to the reference for modifying the time-sequential occurrence of the multimedia information.

17. An apparatus according to claim 16, wherein the means for providing provides a curve sequence containing a discrete series of events each being data determining a pair of a time and a value such that the curve sequence represents a time-variation of the multimedia information, and wherein the means for operating operates the processor to rewrite the value of each event so as to modify the time-variation of the multimedia information.

* * * * *